(12) United States Patent
Shinohara et al.

(10) Patent No.: US 12,413,688 B2
(45) Date of Patent: Sep. 9, 2025

(54) TRANSMISSION METHOD, TRANSMISSION SYSTEM, AND SYSTEM CONTROL DEVICE

(71) Applicant: NEC Corporation, Tokyo (JP)

(72) Inventors: Yusuke Shinohara, Tokyo (JP); Takanori Iwai, Tokyo (JP); Hayato Itsumi, Tokyo (JP); Florian Beye, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/765,487

(22) PCT Filed: Oct. 7, 2019

(86) PCT No.: PCT/JP2019/039446
§ 371 (c)(1),
(2) Date: Mar. 31, 2022

(87) PCT Pub. No.: WO2021/070214
PCT Pub. Date: Apr. 15, 2021

(65) Prior Publication Data
US 2022/0368860 A1 Nov. 17, 2022

(51) Int. Cl.
*H04N 7/18* (2006.01)
*G06V 20/56* (2022.01)

(52) U.S. Cl.
CPC .............. *H04N 7/181* (2013.01); *G06V 20/56* (2022.01)

(58) Field of Classification Search
CPC ........ H04N 7/183; H04N 7/181; H04N 21/24; H04N 21/238; B60W 40/04;
(Continued)

(56) References Cited

U.S. PATENT DOCUMENTS 8,384,825 B2 * 2/2013 Takemura ............ H04N 23/951
348/148
8,441,535 B2 * 5/2013 Morin .................. H04N 25/443
382/104
(Continued)

FOREIGN PATENT DOCUMENTS

JP 2006-205971 A 8/2006
JP 2011-040797 A 2/2011
(Continued)

OTHER PUBLICATIONS

JP Office Action for JP Application No. 2021-550947, mailed on Apr. 18, 2023 with English Translation.
(Continued)

*Primary Examiner* — Christopher S Kelley
*Assistant Examiner* — Asmamaw G Tarko

(57) ABSTRACT

A transmission method, a transmission system, and a system control device that are capable of transmitting a high-quality video suitable for remote operation while suppressing loss and delay are provided. The transmission method is a transmission method of transmitting an image photographed by a plurality of cameras mounted on a vehicle, via a network, and includes a bandwidth estimation step of estimating an available bandwidth of the network, and a camera bandwidth allocation step of allocating a bandwidth to each camera according to the available bandwidth and an importance degree of each camera.

17 Claims, 26 Drawing Sheets

(58) Field of Classification Search
CPC ... B60W 2420/42; G08G 1/16; G08G 1/0112; G08G 1/04; G08G 1/093; G08G 3/02; G06V 20/58; G06V 20/56; G06T 7/00
USPC .......................................................... 348/148
See application file for complete search history.

(56) References Cited

U.S. PATENT DOCUMENTS

| | | | | |
|---|---|---|---|---|
| 11,250,708 | B2* | 2/2022 | Shimizu | G08G 1/202 |
| 2009/0190653 | A1* | 7/2009 | Seo | H04N 5/765 |
| | | | | 375/E7.026 |
| 2014/0002651 | A1* | 1/2014 | Plante | H04N 5/76 |
| | | | | 348/148 |
| 2016/0150070 | A1* | 5/2016 | Goren | H04M 1/72421 |
| | | | | 455/418 |
| 2016/0191861 | A1* | 6/2016 | Tinskey | H04L 65/764 |
| | | | | 348/148 |
| 2017/0186319 | A1* | 6/2017 | Tsushima | B60W 30/0956 |
| 2018/0279175 | A1* | 9/2018 | Gholmieh | H04L 47/6215 |
| 2018/0322777 | A1* | 11/2018 | Titze | G08G 1/0141 |
| 2019/0205662 | A1* | 7/2019 | Samal | G03B 17/02 |
| 2019/0394626 | A1* | 12/2019 | Hitotsumatsu | H04W 4/38 |
| 2021/0264224 | A1* | 8/2021 | Tamaoki | G01S 7/411 |
| 2021/0409650 | A1* | 12/2021 | Kobayashi | H04L 67/12 |

FOREIGN PATENT DOCUMENTS

| | | | |
|---|---|---|---|
| JP | 2016-134816 | A | 7/2016 |
| JP | 2018093401 | A * | 6/2018 |
| JP | 2018-106676 | A | 7/2018 |
| JP | 2018-142921 | A | 9/2018 |
| WO | 2018/003532 | A1 | 1/2018 |

OTHER PUBLICATIONS

JP Office Action for JP Application No. 2021-550947, mailed on Sep. 19, 2023 with English Translation.
International Search Report for PCT Application No. PCT/JP2019/039446. mailed on Nov. 26, 2019.
Wei Huang, "QoE-Oriented Resource Allocation for 360-degree Video Transmission over Heterogeneous Networks", Mar. 21, 2018, pp. 1-12, arXiv:1803.07789v1.
Japanese Office Action for JP Application No. 2021-550947 mailed on Jan. 30, 2024 with English Translation.
Japanese Decision of Dismissal of Amendment for JP Application No. 2021-550947 mailed on Jan. 30, 2024 with English Translation.

* cited by examiner

DISTANCE THRESHOLD TABLE

| | FRONT | REAR | LEFT SIDE | RIGHT SIDE |
|---|---|---|---|---|
| TRAFFIC LIGHT | 15m | 0m | 10m | 10m |
| PERSON | 10m | 0m | 5m | 5m |
| CAR | 10m | 5m | 3m | 3m |
| ... | ... | ... | ... | ... |

Fig. 10

OBJECT IMPORTANCE DEGREE TABLE

| | FRONT | REAR | LEFT SIDE | RIGHT SIDE |
|---|---|---|---|---|
| TRAFFIC LIGHT | 0.5 | 0 | 0.2 | 0.2 |
| PERSON | 0.3 | 0 | 0.3 | 0.3 |
| CAR | 0.4 | 0.3 | 0.2 | 0.2 |
| ... | ... | ... | ... | ... |

Fig. 11

NON-ATTENTION REGION IMPORTANCE DEGREE TABLE

| | FRONT | REAR | LEFT SIDE | RIGHT SIDE |
|---|---|---|---|---|
| IMPORTANCE DEGREE | 0.5 | 0.2 | 0.3 | 0.3 |

Fig. 13

BIT RATE CONVERSION FORMULA TABLE (DISTANCE IS DEFINED AS x)

| | FRONT | REAR | LEFT SIDE | RIGHT SIDE |
|---|---|---|---|---|
| TRAFFIC LIGHT | $a_{00} + b_{00} * x$ | $a_{10} + b_{10} * x$ | $a_{20} + b_{20} * x$ | $a_{30} + b_{30} * x$ |
| PERSON | $a_{01} + b_{01} * x$ | $a_{11} + b_{11} * x$ | $a_{21} + b_{21} * x$ | $a_{31} + b_{31} * x$ |
| CAR | $a_{02} + b_{02} * x$ | $a_{12} + b_{12} * x$ | $a_{22} + b_{22} * x$ | $a_{32} + b_{32} * x$ |
| ... | ... | ... | ... | ... |

Fig. 19

ROI REGION SIZE RATIO TABLE

|  | FRONT | REAR | LEFT SIDE | RIGHT SIDE |
|---|---|---|---|---|
| TRAFFIC LIGHT | 1.1 TIMES | 1.1 TIMES | 1.2 TIMES | 1.2 TIMES |
| PERSON | 1.5 TIMES | 1.5 TIMES | 1.7 TIMES | 1.7 TIMES |
| CAR | 1.7 TIMES | 1.7 TIMES | 1.8 TIMES | 1.8 TIMES |
| ... | ... | ... | ... | ... |

Fig. 21

TRANSMISSION METHOD, TRANSMISSION SYSTEM, AND SYSTEM CONTROL DEVICE

This application is a National Stage Entry of PCT/JP2019/039446 filed on Oct. 7, 2019, the contents of all of which are incorporated herein by reference, in their entirety.

TECHNICAL FIELD

The present disclosure relates to a transmission method, a transmission system, and a system control device.

BACKGROUND ART

Since an available bandwidth fluctuates in vehicle remote monitoring and control via a cellular phone network, there is a fear that video quality deteriorates due to shortage of bandwidths. Heretofore, there has been proposed a method of dynamically adjusting a bit rate of a moving image to be transmitted in accordance with a predicted communication throughput. However, since image quality of the moving image is uniformly adjusted, there is a fear that information necessary for remote monitoring and control cannot be provided when the bandwidth is lowered. Therefore, a method of providing necessary information by transmitting, with high image quality, only camera videos and regions being important for driving is expected.

Non Patent Literature 1 discloses a technique of decreasing image quality of a region which is not viewed by a viewer and increasing image quality of a region which is visually salient and naturally gazed by a human being as an important region. As a method of selecting an important region, there is a saliency map calculation algorithm to be calculated from luminance, hue component, and edge orientation. As a result, it is possible to distribute a high QoE video even in a limited bandwidth.

CITATION LIST

Non Patent Literature

[Non Patent Literature 1] Wei Huang, "QoE-Oriented Resource Allocation for 360-degree Video Transmission over Heterogeneous Networks"

SUMMARY OF INVENTION

Technical Problem

By applying such a technique to remote operation, a high quality of experience (QoE) video can be distributed by transmitting, with high image quality, an important region that is easy for a human being to gaze. However, this technique is not suitable for remote operation. Specifically, some are important for a remote operator even when having low saliency, while others are unimportant for the remote operator even when having high saliency. Therefore, unnecessary loss or delay may still occur.

The present invention has been made in order to solve such a problem, and an object thereof is to provide a transmission method, a transmission system, and a system control device that are capable of transmitting a high-quality video suitable for remote operation while suppressing loss and delay.

Solution to Problem

A transmission method according to a first aspect of the present disclosure is a transmission method of transmitting an image photographed by a plurality of cameras mounted on a vehicle via a network, and includes:
a bandwidth estimation step of estimating an available bandwidth, which is a bandwidth available in the network; and
a camera bandwidth allocation step of allocating a bandwidth to each camera according to the available bandwidth and an importance degree of each camera.

A transmission system according to a second aspect of the present disclosure is a transmission system that transmits an image photographed by a plurality of cameras mounted on a vehicle via a network, and includes:
a bandwidth estimation unit configured to estimate an available bandwidth in the network; and
a camera bandwidth allocation unit configured to allocate a bandwidth to each camera according to the available bandwidth and an importance degree of each camera.

A system control device according to a third aspect of the present disclosure includes:
a bandwidth estimation unit configured to estimate an available bandwidth which is a bandwidth available in a network, in order to transmit an image photographed by a plurality of cameras mounted on a vehicle; and
a camera bandwidth allocation unit configured to allocate a bandwidth to each camera according to the available bandwidth and an importance degree of each camera.

Advantageous Effects of Invention

According to the present disclosure, it is possible to provide a transmission method, a transmission system, and a system control device that are capable of transmitting a high-quality video suitable for remote operation while suppressing loss and delay.

BRIEF DESCRIPTION OF DRAWINGS

FIG. 10 illustrates an example of a distance threshold table.

FIG. 11 illustrates an example of an object importance degree table.

FIG. 13 illustrates an example of a non-attention region importance degree table.

FIG. 19 illustrates an example of a bit rate conversion formula table.

FIG. 21 illustrates an example of a ROI region size ratio table.

DESCRIPTION OF EMBODIMENTS

Figure 1:
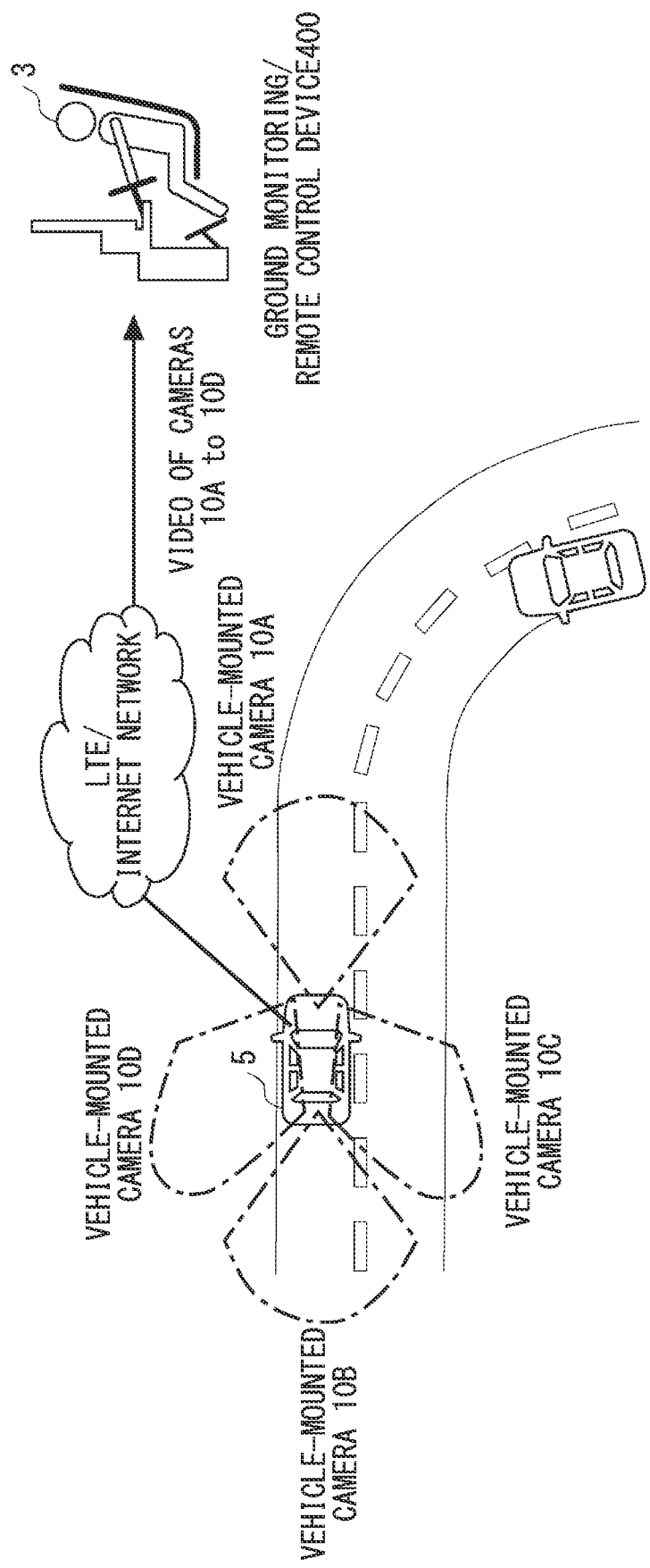
FIG. 1 is a schematic diagram explaining an outline of a remote monitoring operation system.

An outline of a remote monitoring operation system will be described with reference to FIG. 1.

The remote monitoring operation system remotely controls a vehicle 5 that does not require a driver from the remote monitoring center. As a method of remotely controlling an unmanned operation vehicle 5, videos photographed by a plurality of vehicle-mounted cameras 10A to 10D mounted on the vehicle 5 are transmitted to a ground monitoring control device 400 via a wireless communication network and the Internet. A remote operator 3 performs remote control while watching the received video on a monitor. A remote operation control device mounted on the vehicle 5 performs bi-directional communication with the ground monitoring remote control device 400 by using a communication system (e.g., LTE, 5G) using a cellular phone network. The remote monitoring operation system may be switched to remote control or automatic control when a vehicle under remote monitoring is traveling and a danger of the vehicle is detected. In other words, a vehicle driven by a person may be temporarily switched to such control, and a driver may be present in the vehicle.

The vehicle-mounted camera 10A photographs a front of the vehicle, the vehicle-mounted camera 10B photographs a rear of the vehicle, the vehicle-mounted camera 10C photographs a right of the vehicle, and the vehicle-mounted camera 10D photographs a left of the vehicle. The number of vehicle-mounted cameras is not limited to this, and may be five or more. Performance of each camera is basically the same, but may be slightly different. Conventional drivers, such as taxis, are required to have a second-class license, which requires a person with a visual acuity of 0.8 or more to be able to recognize objects (also referred to as physical objects) in a range of vision. Therefore, it is desirable that the video provided to the remote operator allows a person with a visual acuity of 0.8 or more to recognize an object in a range of vision (e.g., in a case of a road sign on a general road, the driver can recognize the sign at a distance of 10.66 m). It is necessary for the remote operator to visually recognize not only the object but also peripheral information of the object, and it is desirable to transmit such peripheral information to the remote operator as a relatively high-quality video as well.

Figure 2:
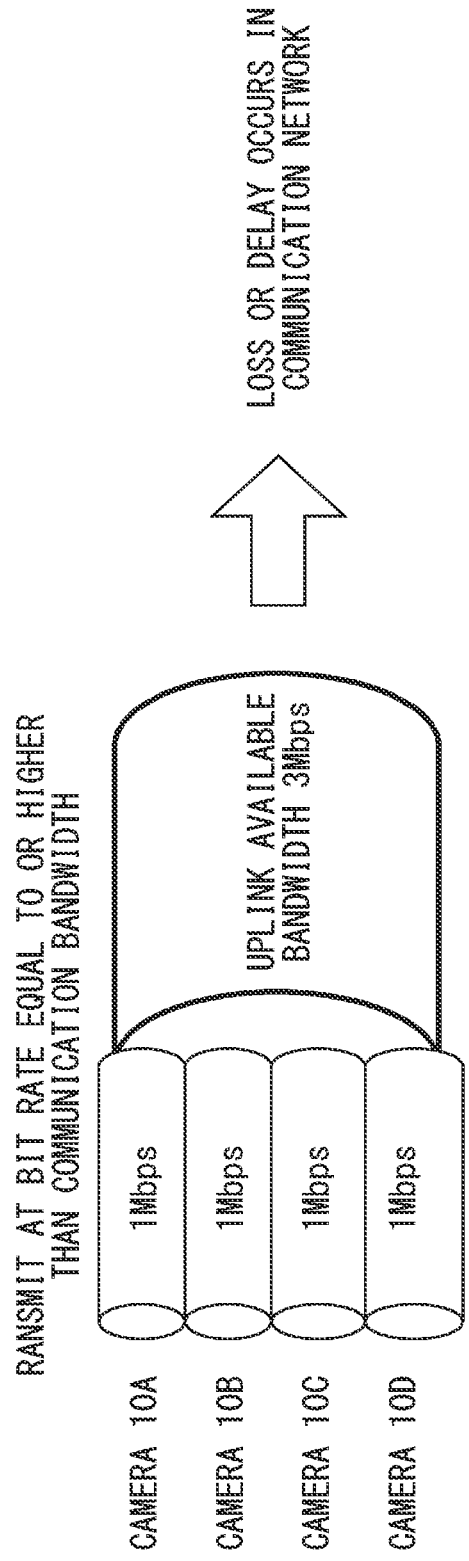
FIG. 2 is a diagram explaining a bandwidth shortage in a remote monitoring system via a mobile network.

FIG. 2 is a diagram explaining a bandwidth shortage in a remote monitoring system via a mobile network.

As illustrated in FIG. 2, videos photographed by the cameras 10A to 10D are uniformly transmitted via a cellular phone network. However, in the cellular phone network, since an available bandwidth (hereinafter, sometimes referred to as an available bandwidth) may fluctuate, the video quality may deteriorate due to a bandwidth shortage. When the video is transmitted at a bit rate equal to or higher than a communication bandwidth, loss or delay may occur in a communication network. The present invention solves these problems. In other words, the present invention has a function of determining an image region to be observed by a remote operator from an image photographed by a vehicle-mounted camera, and a function of determining an important camera from a plurality of cameras and automatically extracting a region important for remote operation from camera images. In addition, in the present system, since there are limitations on vehicle-mounted computer resources, it may be necessary to cooperate with a computer on a remote operator side, which has abundant computer resources.

Therefore, in the present invention, a distance between the detected object and the vehicle is estimated, an importance degree for each object is determined, a certain region of the object having a high degree of importance is preferentially refined, and transmitted to the remote control device on the remote operator side. The importance degree is calculated from a type of the object (physical object) and the distance from the vehicle to the object. Actual distances and orientations with respect to the position and size in the image are learned for each physical object type in advance, and the distance to the object and the orientation of the object are estimated from the image when the system is implemented. A large amount of available bandwidth is allocated to a camera having a high total importance degree value of all objects in an image photographed by each camera. Since the object that needs to be watched differs for each camera and the priority of the camera also differs, the importance degree for the distance and the orientation is set for each physical object type for each camera.

In particular, a method implemented by the system includes preliminary work (learning) and system implementation steps. As a preliminary work, a distance from the vehicle with respect to the position and size in the image photographed by each camera is measured and learned, and the importance degree with respect to the distance from the vehicle is set for each type of the camera and the physical object. In addition, when the system is implemented, a physical object in an image photographed by each camera is recognized, and a position, a size, and a type of the physical object in the image are acquired. Further, the importance degree for the distance from the vehicle and the orientation is identified for each camera and physical object type set in advance, and the importance degree is identified from the position, size, and type of the recognition physical object. Further, a total value of importance degrees of the physical object photographed for each camera is calculated, and the bandwidth is distributed to each camera from the available bandwidth according to the importance degrees. The bandwidth is distributed to a region where the physical object exists in each camera, based on the bandwidth distributed to the region and the importance degree of the physical object. By doing so, it is possible to increase a probability that the remote operator can recognize a physical object affecting the driving even in a limited bandwidth. Example embodiments of the present invention will be described below with reference to the drawings.

First Example Embodiment

Figure 3:
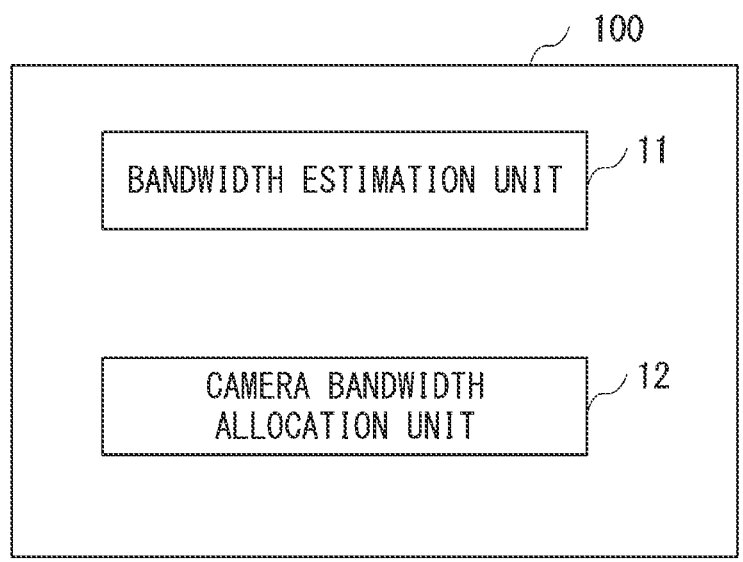
FIG. 3 is a block diagram illustrating a configuration in a transmission system according to a first example embodiment.

FIG. 3 is a block diagram illustrating a configuration in a transmission system according to a first example embodiment. As illustrated in FIG. 3, the transmission system according to the first example embodiment includes an information processing device 100 including a bandwidth estimation unit 11 and a camera bandwidth allocation unit 12 (a hardware configuration of which will be described later by using FIG. 26). The transmission system is a transmission system for transmitting an image photographed by a plurality of cameras mounted on a vehicle via a network, and includes a bandwidth estimation unit 11 that estimates an available bandwidth of the network, and a camera bandwidth allocation unit 12 that allocates a bandwidth for each camera according to the usable bandwidth and an importance degree of each camera. The information processing device 100 may be referred to as a system control device.

Figure 4:
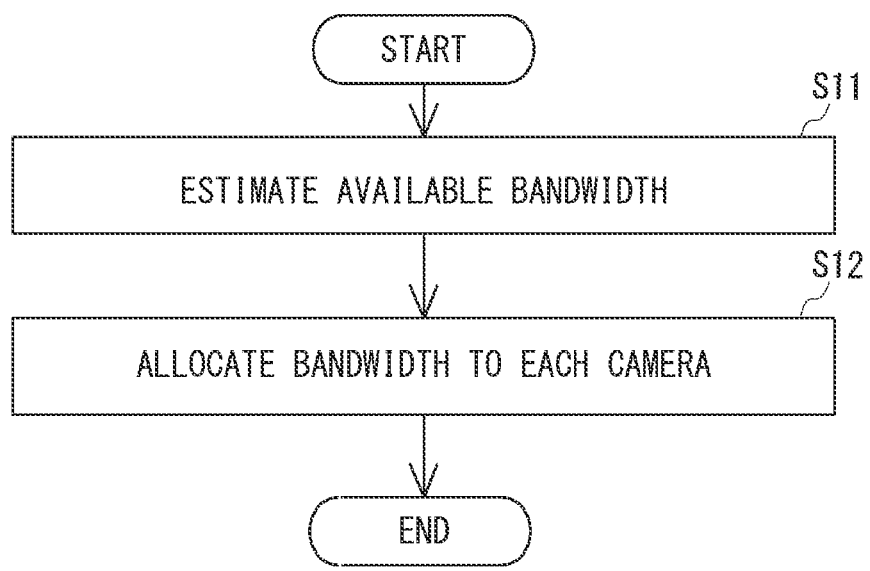
FIG. 4 is a flowchart illustrating an operation of the transmission system according to the first example embodiment.

FIG. 4 is a flowchart illustrating an operation of the transmission system according to the first example embodiment. As illustrated in FIG. 4, the transmission method according to the present example embodiment is a transmission method for transmitting an image photographed by a plurality of cameras mounted on a vehicle via a network, and includes a bandwidth estimation step (step S11) of estimating an available bandwidth of the network, and a camera bandwidth allocation step (step S12) of allocating a bandwidth for each camera according to the available bandwidth and an importance degree of each camera.

According to the first example embodiment described above, it is possible to provide a transmission method and a transmission system capable of transmitting a high-quality video suitable for remote operation while suppressing loss and delay by allocating a bandwidth according to the importance degree of each camera.

Second Example Embodiment

Figure 5:
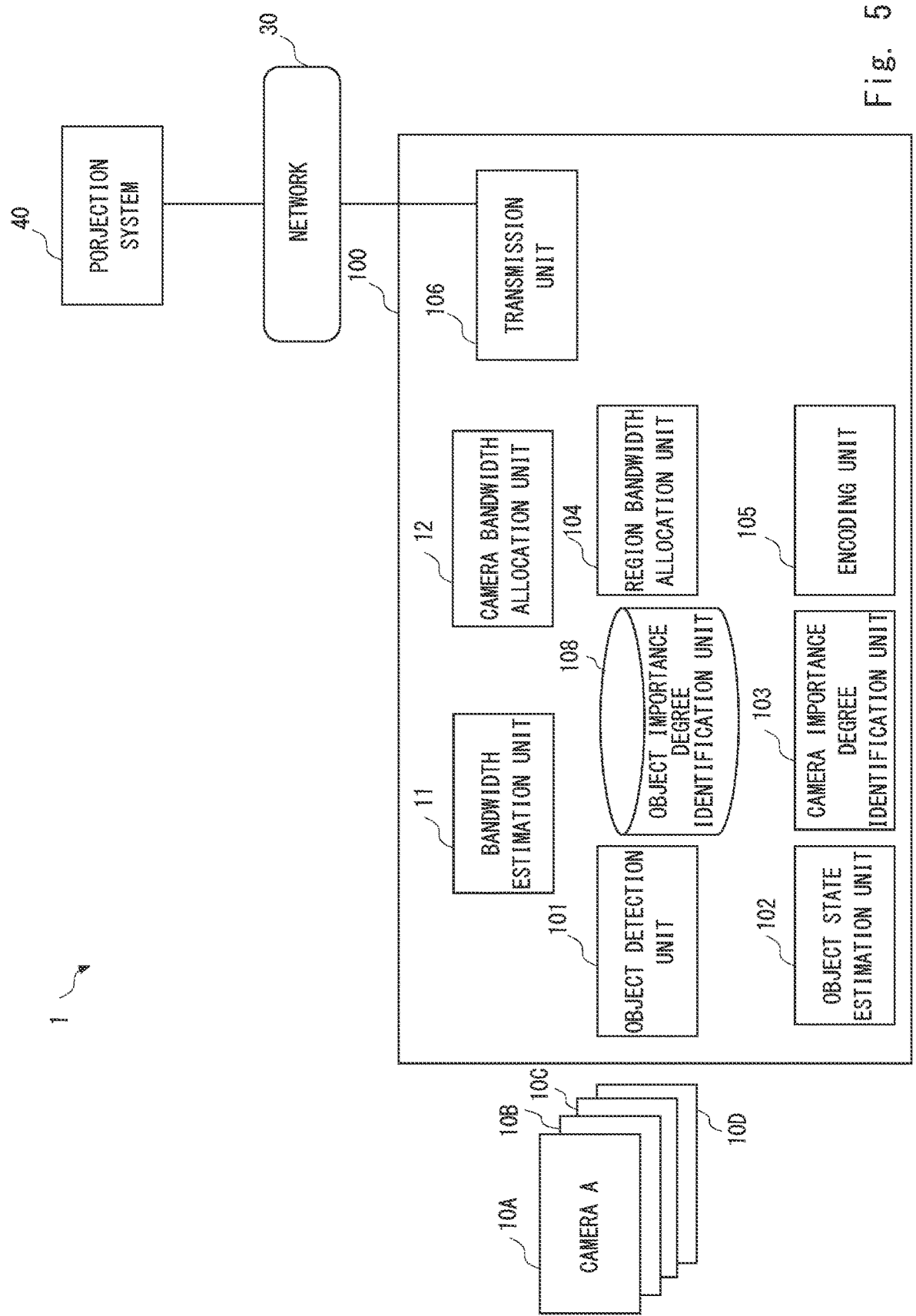
FIG. 5 is a block diagram illustrating a configuration of a transmission system according to a second example embodiment.
Figure 6:
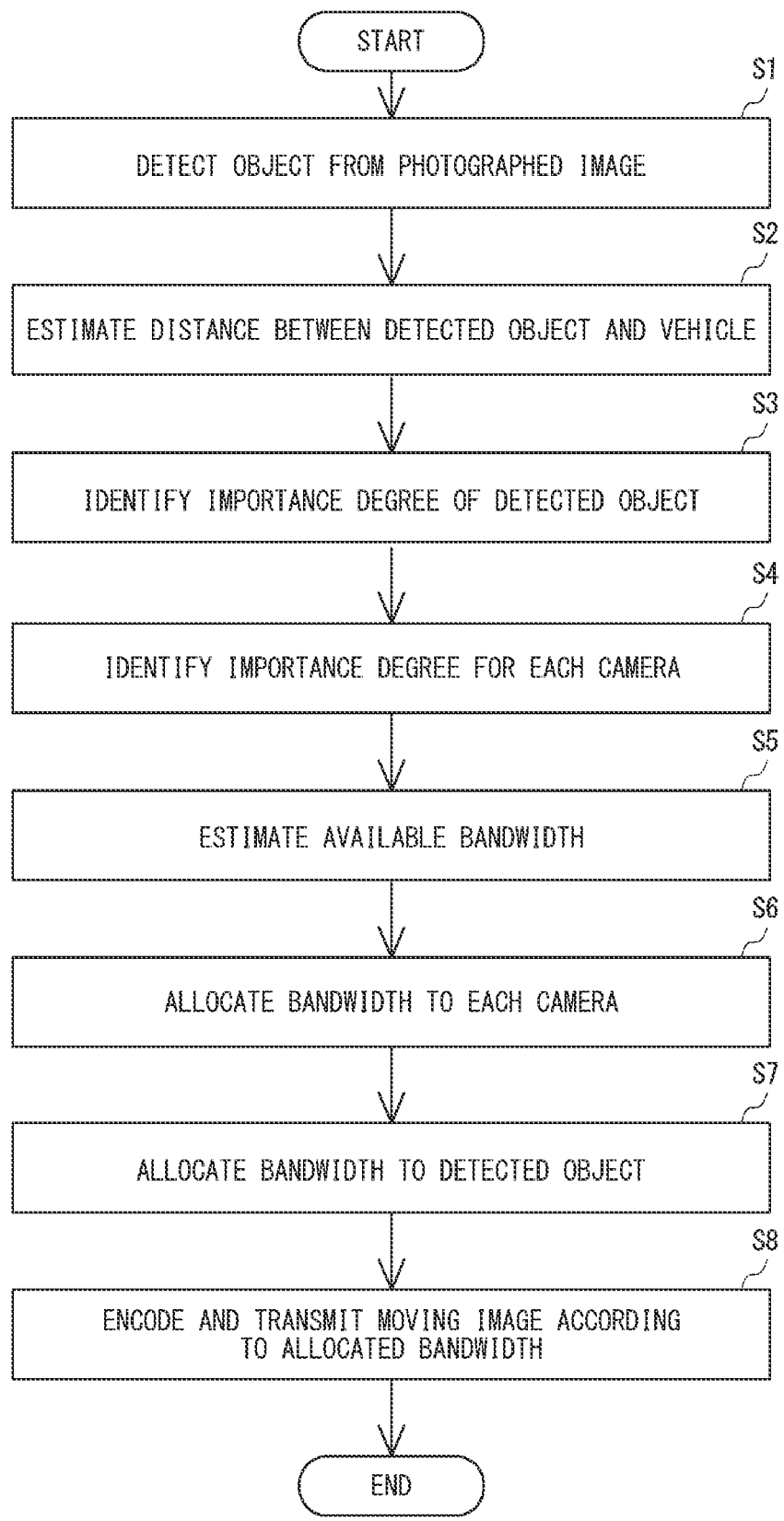
FIG. 6 is a flowchart illustrating an operation of the transmission system according to the second example embodiment.

FIG. 5 is a block diagram illustrating a configuration of a transmission system 1 according to a second example embodiment. FIG. 6 is a flowchart illustrating an operation of the transmission system according to the second example embodiment.

Figure 26:
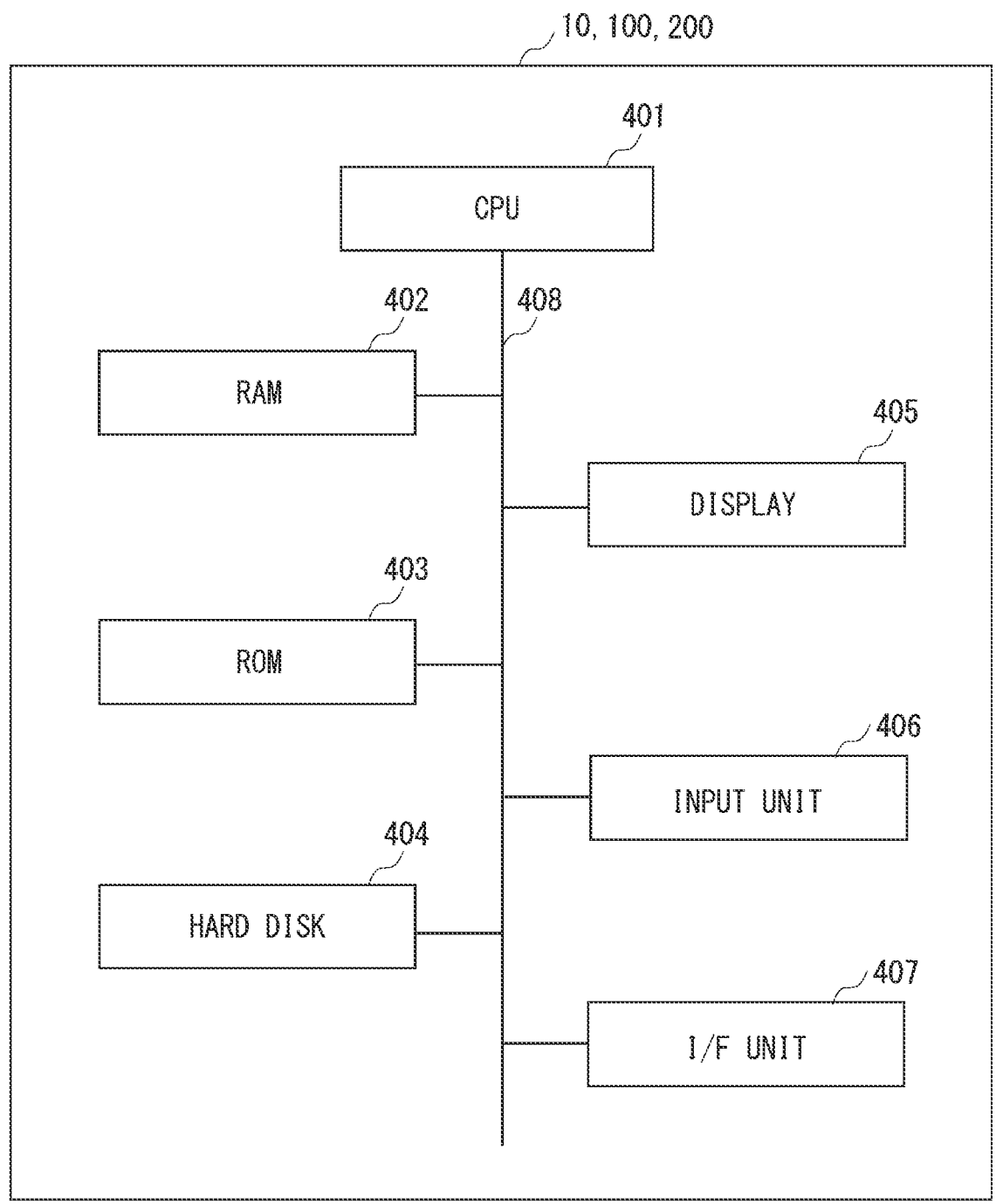
FIG. 26 is a block diagram illustrating an example of a hardware configuration of an information processing device according to the present example embodiment.

The transmission system 1 encodes images photographed by a plurality of cameras 10A to 10D mounted on a vehicle into a moving image and transmits the moving image. The transmission system 1 includes an information processing device 100 that analyzes an image photographed by the vehicle-mounted camera 10, manages a communication bandwidth, based on the analysis result, and transmits video data via a network 30. The video data are projected onto a projection system 40 at a remote monitoring center and presented to a remote operator. In the present example embodiment, a single information processing device 100 physically performs overall processing on a plurality of cameras. FIG. 26 is a block diagram illustrating an example of a hardware configuration of the information processing device 100 (or 10, 200). As illustrated in FIG. 26, the information processing device 100 (or 10, 200) of the present example embodiment is a computer having a central processing unit (CPU) 401, a random access memory (RAM) 402, a read only memory (RAM) 403, and the like. The CPU 401 performs calculation and control in accordance with software stored in the RAM 402, the ROM 403, or the hard disk 404. The RAM 402 is used as a temporary storage region when the CPU 401 executes various processes. The hard disk 404 stores an operating system (OS), a registration program to be described later, and the like. The display 405 is composed of a liquid crystal display and a graphic controller, and an object such as an image or an icon, a GUI, and the like are displayed on the display 405. The input unit 406 is a device for the user to give various instructions to a terminal device, and is configured by, for example, a mouse or a keyboard. An interface (I/F) unit 407 can control wireless LAN communication and wired LAN communication conforming to standards such as IEEE 802.11a, and communicates with external devices via the same communication network and the Internet, based on a protocol such as TCP/IP. The system bus 408 controls data exchange with the CPU 401, the RAM 402, the ROM 403, the hard disk 404, and the like. The control unit also functions as a function calculation unit that executes each of the subdivided processes.

As illustrated in FIG. 5, the information processing device 100 includes a bandwidth estimation unit 11, a camera bandwidth allocation unit 12, an object detection unit 101, an object state estimation unit 102, an object importance degree identification unit 108, a camera importance degree identification unit 103, a region bandwidth allocation unit 104, an encoding unit 105, and a transmission unit 106.

A transmission method according to the present example embodiment will be described with reference to FIG. 6. Although the flowchart of FIG. 6 illustrates a specific order of execution, the order of execution may be different from the illustrated form. For example, the order of execution of two or more steps may be interchanged with respect to the order illustrated. Also, two or more steps illustrated in succession in FIG. 6 may be performed simultaneously or partially simultaneously. Further, in some example embodiments, one or more of the steps illustrated in FIG. 6 may be skipped or omitted.

The object detection unit 101 detects a target object from images photographed by a plurality of cameras, and acquires a type of the object, a position of the object in the image, and a size of the object in the image (step S1). The object state estimation unit 102 estimates a distance from the vehicle to the object, based on the type of the detected object, the position of the object in the image, and the size of the object in the image (step S2). The object importance degree identification unit 108 manages the importance degree with respect to the object type and the distance from the vehicle (vehicle-mounted camera) in association with each camera, and identifies the importance degree of the detected object, based on the importance degree (step S3). The camera importance degree identification unit 103 identifies the importance degree for each camera, based on a total value of the importance degrees of the detected objects detected for each camera (step S4).

The bandwidth estimation unit 11 estimates the available bandwidth (step S5). In the cellular mobile phone network, since the available bandwidth constantly fluctuates, the bandwidth estimation unit 11 estimates the available bandwidth at a predetermined cycle (e.g., every second). The camera bandwidth allocation unit 12 allocates a bandwidth for each camera according to the estimated available bandwidth and the importance degree of each camera (step S6). The region bandwidth allocation unit 104 allocates a bandwidth allocated to each camera (sometimes referred to as a camera bandwidth) and a bandwidth for transmission of a moving image of a region in which a detected object is photographed according to the importance degree of the object (step S7). The encoding unit 105 performs encoding into the moving image according to the allocated bandwidth. The transmission unit 106 transmits the encoded moving image (step S8).

The transmission method and transmission system 1 according to the present example embodiment described above can transmit a high-quality video suitable for remote operation while suppressing loss and delay.

Third Example Embodiment

Figure 7:
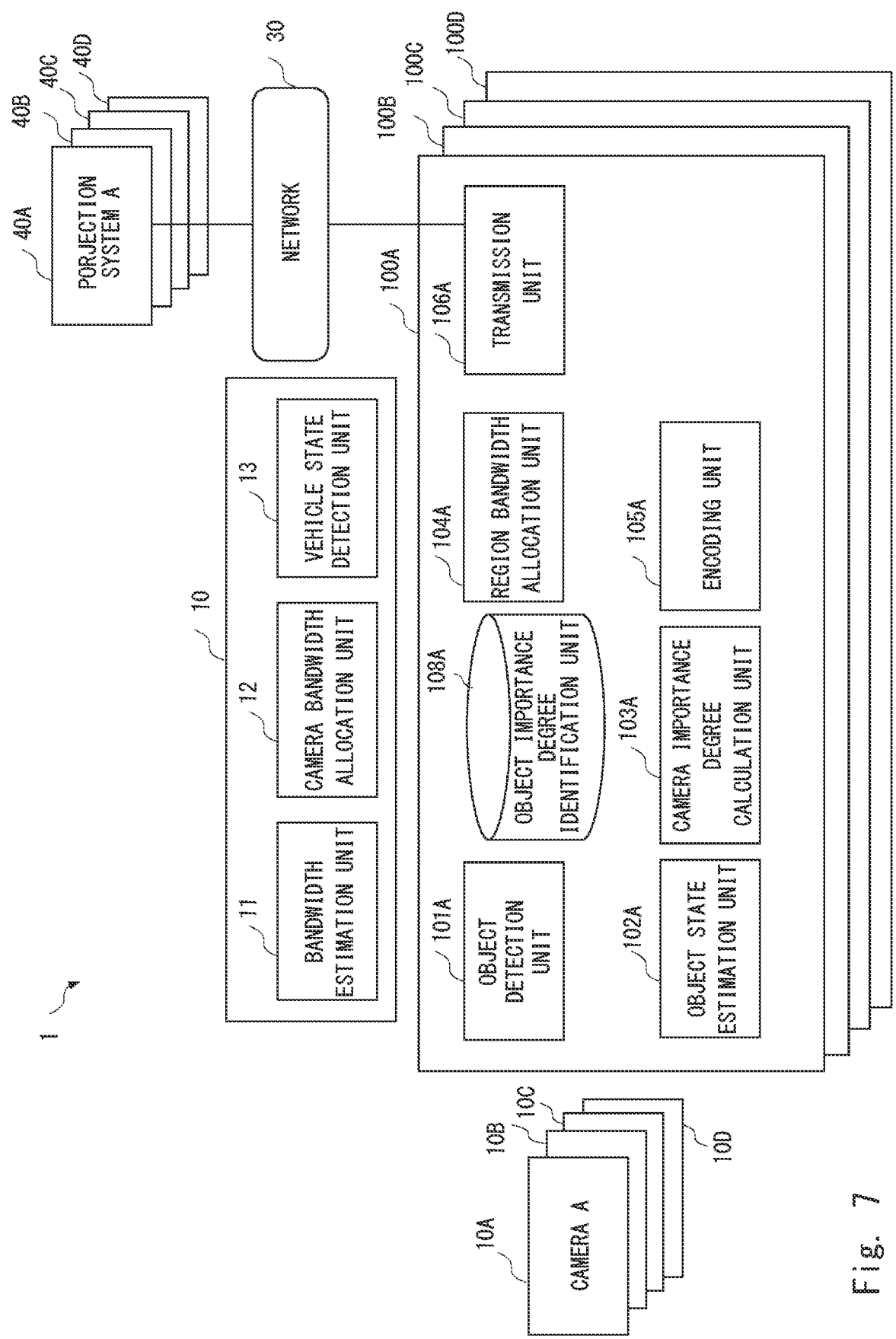
FIG. 7 is a block diagram illustrating a configuration of a transmission system according to a third example embodiment.

FIG. 7 is a block diagram illustrating a configuration of a transmission system 1 according to a third example embodiment. In FIG. 7, the same components as those of the second example embodiment are denoted by the same reference numerals as those of FIG. 5, and description thereof is omitted as appropriate. The present example embodiment defines the operation of the second example embodiment in more detail, and will be described below with reference to FIG. 6, which is a flowchart of the second example embodiment.

In this system, as illustrated in FIG. 7, a plurality of information processing devices 100A to 100D, which are associated to vehicle-mounted cameras 10A to 10D, are provided. As described above, the present system includes the plurality of information processing devices 100A to 100D, and is configured to process images from the plurality of cameras in a distributed manner. Further, the present system generally includes an information processing device 10 including a bandwidth estimation unit 11 that estimates an available bandwidth, and a camera bandwidth allocation unit 12 that allocates a bandwidth to each camera, based on the estimated available bandwidth and an importance degree of camera for each camera. Further, in the present example embodiment, a vehicle state detection unit 23 that detects a vehicle state such as whether the vehicle is moving forward, moving backward, turning left, or turning right is generally added to the information processing device 10. For example, the vehicle state detection unit 23 may estimate the vehicle state, based on the video photographed by each camera, or may detect the vehicle state through a vehicle-mounted network controller area network (CAN). Alternatively, the vehicle state detection unit 13 can determine what gear to put the vehicle in (e.g., drive, reverse, etc.) or by a sensor.

Although the present system is configured to generally include the information processing device 10, the present system is not limited to this, and the bandwidth estimation unit 11, the camera bandwidth allocation unit 12, and the vehicle state detection unit 13 may also be configured to be distributed to the information processing devices 100A to 100D.

Figure 8:
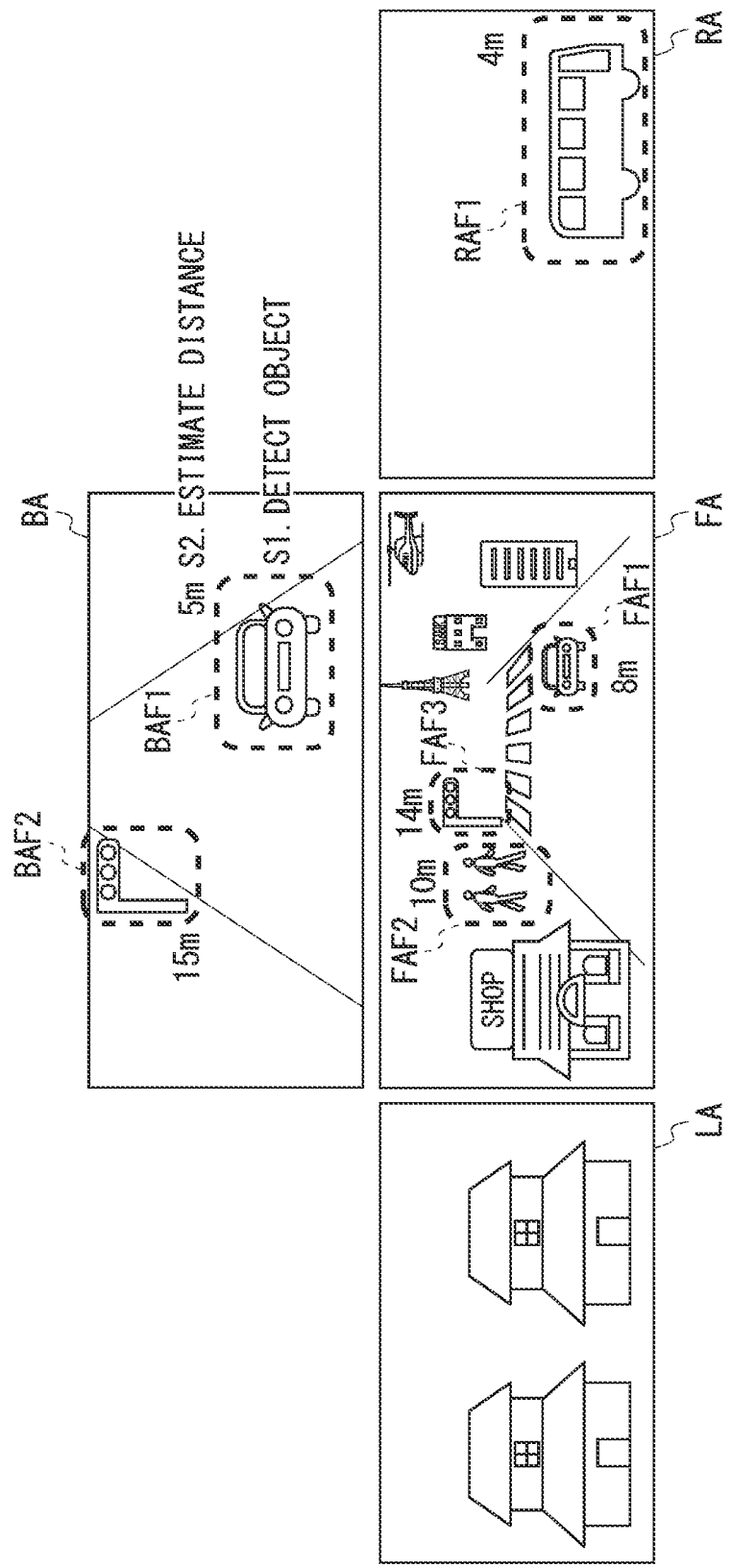
FIG. 8 is a diagram explaining an object detection process and an object state estimation process by using an example of a video photographed by each camera.

With reference to FIG. 8, operations of the object detection unit 101 and the object state estimation unit 102 according to the present example embodiment will be described in detail.

FIG. 8 is a diagram explaining an object detection process (step S1) and an object state estimation process (step S2) by using an example of a video photographed by each camera. Such a video may be displayed on a monitor viewed by a remote operator 3 or displayed on a monitor mounted on the vehicle 5, in the ground monitoring remote control device 400 illustrated in FIG. 1.

A video photographed by the front vehicle-mounted camera 10A is illustrated as a front region video FA. A video photographed by the rear vehicle-mounted camera 10B is illustrated as a rear region video BA. A video photographed by the right vehicle-mounted camera 10C is illustrated as a right region video RA. A video photographed by the left vehicle-mounted camera 10D is illustrated as a left region video LA.

First, the object detection unit 101 detects objects such as traffic lights, road signs, people, cars, buses, trucks, motorcycles, and bicycles with respect to image data photographed by each camera. The object detection unit 101 can detect an object by depth learning, and can utilize a model in which these images are learned in advance.

As illustrated in FIG. 8, three gaze regions surrounding the object are detected in the front region video FA. In other words, an oncoming vehicle is detected in the front region gaze region FAF1, a person is detected in the front region gaze region FAF2, and a traffic light is detected in the front region gaze region FAF3.

Two gaze regions are detected in the rear region video BA. In other words, a following vehicle is detected in the rear region gaze region BAF1, and a traffic light is detected in the rear region gaze region BAF2. Further, one gaze region is detected in the right region video RA. In other words, a bus is detected in the right region gaze region BAF1. On the other hand, there is no object to be detected as a gaze region in the left region video LA. The objects detected as the gaze regions are to be gazed by the remote operator. Regions other than these gaze regions are referred to as non-gaze regions and include regions that are not important to the remote operator (e.g., helicopters flying in the air, stores or houses beside roads, buildings, towers, etc.).

Next, the object state estimation unit 102 estimates a distance from own vehicle (vehicle-mounted camera) to the detected object by using the detection result by the object detection unit 101 (step S2). Since the vehicle-mounted camera is fixed to the vehicle and a range (angle of view) of the video is also fixed, the object state estimation unit 102 can estimate the distance to the object, based on the position and size (shape) in the image. In addition, the object state estimation unit 102 may estimate the distance and an orientation by the depth learning. In other words, a result of detecting an image of these objects, a distance of a car with respect to the object, and an orientation with respect to the car may be learned in advance. Further, since a viewing way (angle of view) of the object is different for each camera, it is desirable to construct a learning model for each camera in order to improve its accuracy. In other words, the object state estimation units 102A to 102D use different learning models. Such a learning model may be stored in a storage unit inside the object state estimation units 102A to 102D, or may be stored in an external storage unit connected to the object state estimation units 102A to 102D via a network. Alternatively, the learning model constructed for each camera may be stored in a storage unit of the information processing device that generally manages the present system.

In this manner, the object state estimation units 102A to 102D estimate a distance from the vehicle-mounted cameras 10A to 10D to the object. For example, as illustrated in FIG. 8, the oncoming vehicle in the front region gaze region FAF1 is located 8 m from the vehicle-mounted camera 10A, the person in the front region gaze region FAF2 is located 10 m from the vehicle-mounted camera 10A, and the traffic light in the front region gaze region FAF3 is located 14 m from the vehicle-mounted camera 10A. The following vehicle in the rear region gaze region BAF1 is located 5 m from the vehicle-mounted camera 10D, and the traffic light in the rear region gaze region BAF2 is located 15 m from the vehicle-mounted camera 10D. In addition, the bus in the right region gaze region BAF1 is located 4 m from the vehicle-mounted camera 10C. Note that the object name (BAF1, etc.), the distance (4 m), the allocated bandwidth (0.4 Mbps), and the like described in this figure may or may not be displayed on a video displayed on a monitor or the like.

Next, an object importance degree identification process (step S3) will be described with reference to FIGS. 9 to 11.

Figure 9:
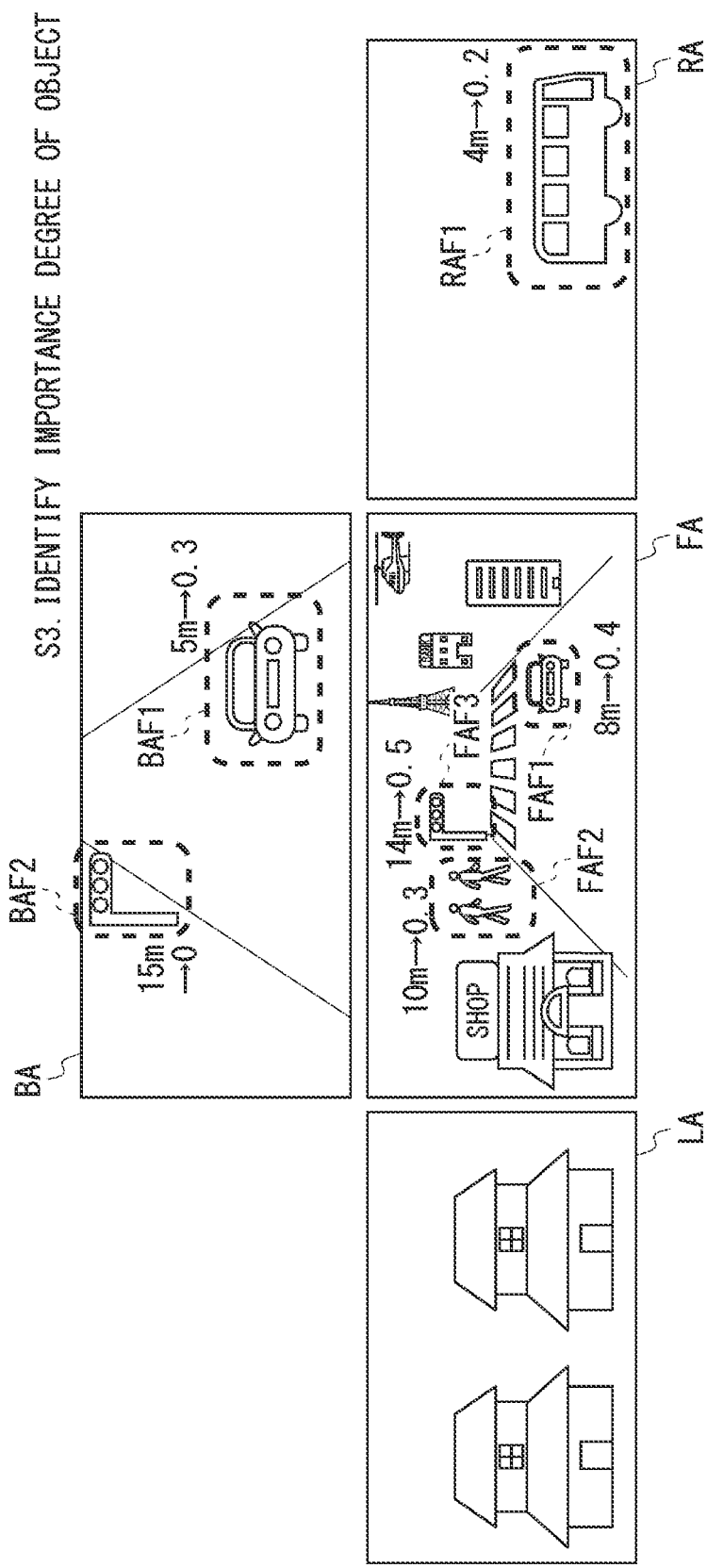
FIG. 9 is a diagram explaining an object importance degree identification process by using an example of a video photographed by each camera.

FIG. 9 is a diagram explaining the object importance degree identification process by using an example of a video photographed by each camera. Note that the video of FIG. 9 is the same as the video of FIG. 8.

Since importance degrees of objects detected by each camera are different (e.g., a traffic light ahead of the vehicle is important, but a traffic light behind the vehicle is of low important), the object importance degree identification units 108A to 108D manage different distance threshold tables and object importance degree tables, respectively. FIG. 10 illustrates an example of a distance threshold table managed by the object importance degree identification unit 108A. FIG. 11 illustrates an example of an object importance degree table managed by the object importance degree identification unit 108A. Note that the above-mentioned distance threshold table and the object importance degree table are tables in a case where the vehicle is moving forward, and these tables may be different depending on a state of the vehicle, such as when the vehicle is moving backward, turning left, turning right, or the like. In other words, the object importance degree identification unit 108 may change the distance threshold table and the object importance degree table according to the vehicle state detected by the vehicle state detection unit 23.

The object importance degree identification unit 108 may change the distance threshold table and the object importance degree table according to not only the distance between the vehicle and the object, which is estimated by the object state estimation unit 102, but also an orientation of the object (i.e., when the object is a car, an oncoming vehicle, a preceding vehicle, an intruding vehicle from the right side or the left side).

Also, objects to be detected include stationary objects (e.g., traffic lights) and moving objects (e.g., cars, people). When the object is a moving object, a predicted position (=motion) of the object in time series may be held, a size of the region may be enlarged or reduced according to a moving speed, and the region in which the object exists may be acquired with high probability. In other words, as the moving speed increases, a size of the region surrounding the object may be enlarged. Further, a prediction error or a confidence or a probability distribution may be output from an object position prediction unit in addition to the object prediction position, the region size is enlarged or reduced, and a region in which the object exists with high probability may be acquired.

As illustrated in FIGS. 10 and 11, the importance degree is fixedly determined for objects within a distance determined for each type of objects. For example, traffic lights within 15 m ahead of the vehicle, people within 10 m, and cars within 10 m are set to be important. A vehicle within 5 m of the rear of the vehicle is set to be important. In addition, traffic lights within 10 m on the left and right sides of the vehicle, people within 5 m, and cars within 3 m are set to be important.

The importance degree identification process is performed by referring to the distance threshold table (FIG. 10), regarding an object closer to a threshold as an important object, and assigning the importance degree described in the object importance degree table (FIG. 11) to the important object. As illustrated in FIG. 9, since the oncoming car of the front region gaze region FAF1 is 8 m, 0.4 is assigned, and since the person of the front region gaze region FAF2 is 10 m, 0.3 is assigned, and since the traffic light of the front region gaze region FAF3 is 14 m, 0.5 is assigned. Since the following vehicle in the rear region gaze region BAF1 is 5 m, 0.3 is assigned, and since the traffic light in the rear region gaze region BAF2 is 15 m, 0 is assigned. Further, since the bus in the right region gaze region BAF1 is 4 m, 0.2 is allocated.

Figure 12:
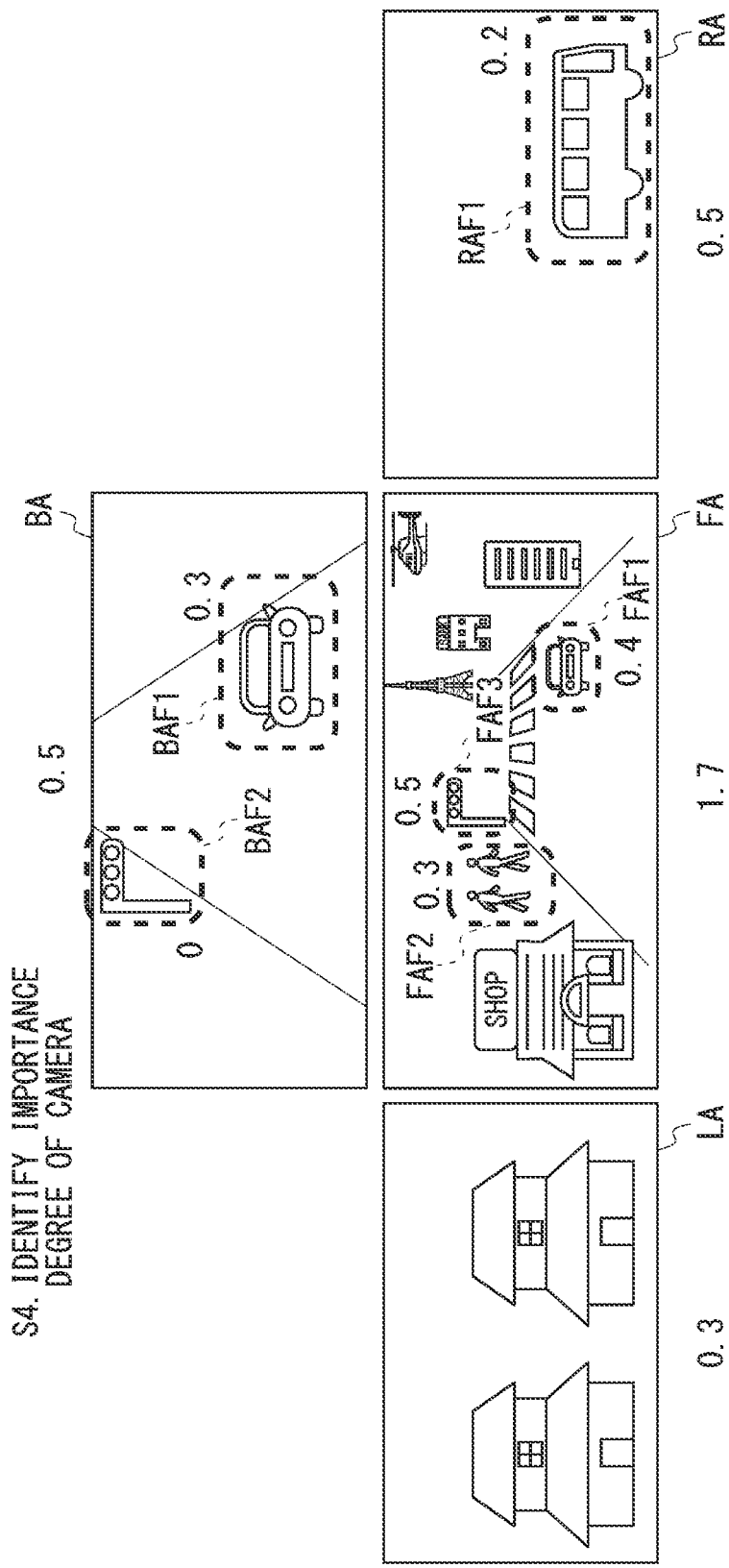
FIG. 12 is a diagram explaining a camera importance degree identification process by using an example of a video photographed by each camera.

Next, a camera importance degree identification process (step S4) will be described with reference to FIGS. 12 and 13. FIG. 12 is a diagram explaining the camera importance degree identification process by using an example of a video photographed by each camera. FIG. 13 is an example of a non-gaze region importance degree table.

The camera importance degree identification unit 103A identifies a camera importance degree from a total value of the importance degrees of all the detected objects photographed by the camera and importance degrees of the non-gaze regions (step S4). The non-gaze region refers to a region other than the gaze region surrounding the detected object in the entire screen, which is photographed by each camera. As illustrated in the non-gaze region importance degree table of FIG. 13, the importance degree of the non-gaze region differs depending on each camera (front, rear, left side, right side).

For example, the camera importance degree of the front region video FA is calculated to be 1.7 by adding an importance degree (i.e., 0.5) of the front non-gaze region to the total (i.e., 0.4+0.3+0.5) of the importance degrees of the detected objects (oncoming cars, people, and traffic lights).

Similarly, the camera importance degree of the rear region video BA is calculated to be 0.5 by adding an importance degree (i.e., 0.2) of the rear non-gaze region to the total (i.e., 0.3+0) of the importance degrees of the detected objects (following vehicles and traffic lights). An importance degree of the right region video RA is calculated to be 0.5 by adding an importance degree (0.3) of the right non-gaze region to the total (0.2) of the importance degree of the detected object (bus). Since there is no detected object, an importance degree of the left region video LA is calculated to be 0.3 from the importance degree of the left non-gaze region.

Figure 14:
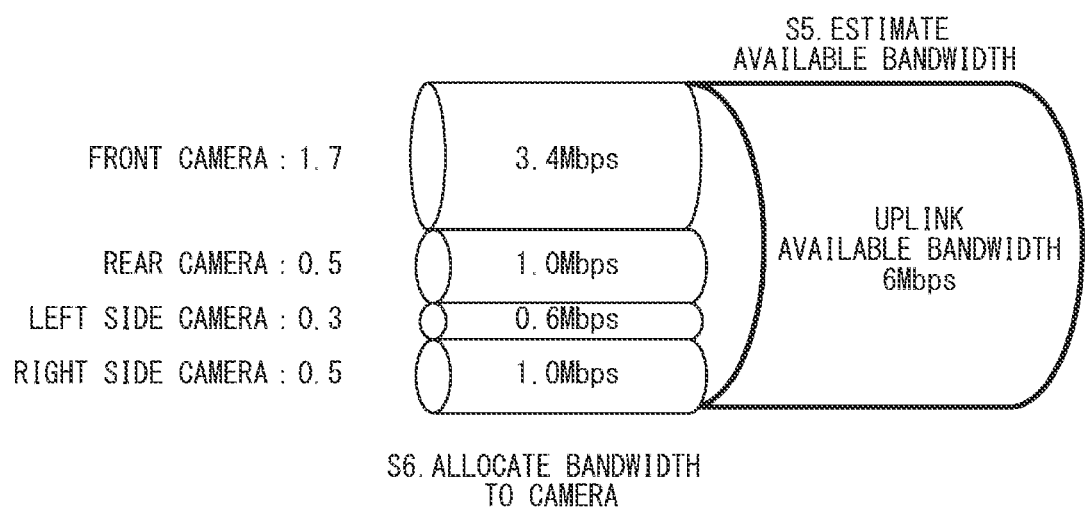
FIG. 14 is a diagram explaining an available bandwidth estimation process and a camera bandwidth allocation process by using an example of a video photographed by each camera.

Next, an available bandwidth estimation process (step S5) and a camera bandwidth allocation process (step S6) will be described with reference to FIG. 14.

The bandwidth estimation unit 11 estimates an available bandwidth (step S5). In the cellular phone network, since the available bandwidth constantly fluctuates, the bandwidth estimation unit 11 estimates the available bandwidth at a predetermined cycle (e.g., every second). In FIG. 14, an uplink available bandwidth is estimated to be 6 Mbps.

Next, the camera bandwidth allocation unit 12 allocates a bandwidth for each camera according to the available bandwidth (6 Mbps) and the camera importance degree for each camera described above (step S6). As described above, the importance degree of the front camera is 1.7, the importance degree of the rear camera is 0.5, the importance degree of the left side camera is 0.3, and the importance degree of the right side camera is 0.5. An allocated bandwidth of the front camera is calculated to be 3.4 Mbps by multiplying the estimated uplink available bandwidth (6 Mbps) by 1.7/3.0. Similarly, an allocated bandwidth of the rear camera is calculated to be 1.0 Mbps, an allocated bandwidth of the left side camera is calculated to be 0.6 Mbps, and an allocated bandwidth of the right side camera is calculated to be 1.0 Mbps.

Figure 15:
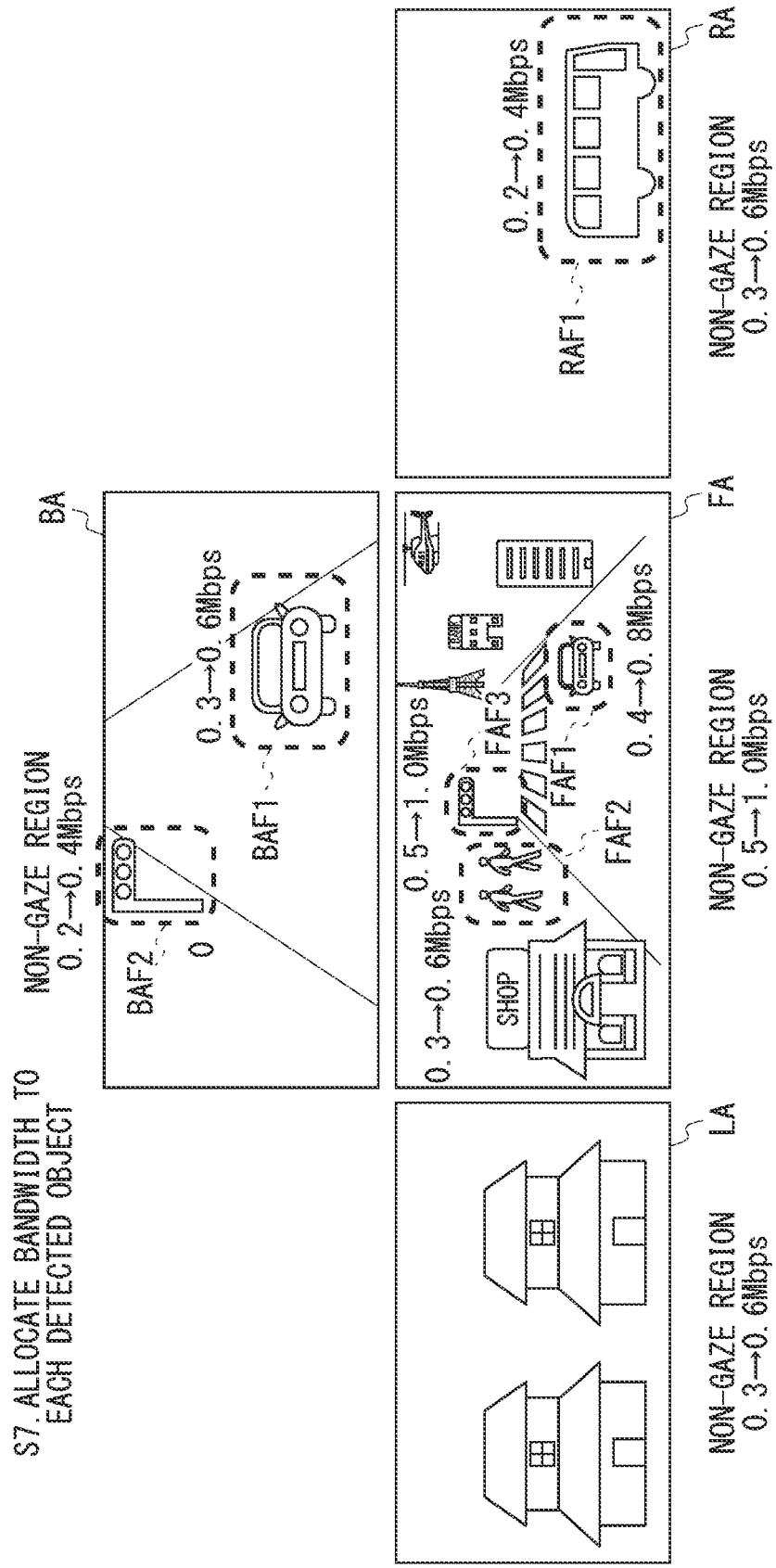
FIG. 15 is a diagram explaining a detection object bandwidth allocation process by using an example of a video photographed by each camera.

Finally, with reference to FIG. 15, a detected object bandwidth allocation process (step S7) will be described.

A region bandwidth allocation unit 104A allocates a bandwidth for transmission of the detected object from the camera bandwidth according to the importance degree of the detected object (step S7). A region allocation bandwidth of each detected object is allocated in a proportional distribution according to the importance degree of the detected object. For example, in the front region FA, a region allocation bandwidth for the oncoming vehicle in the front region gaze region FAF1 is calculated to be 0.8 Mbps by multiplying 3.4 Mbps by 0.4/1.7. A region allocation bandwidth for the person in the front region gaze region FAF2 is calculated to be 0.6 Mbps by multiplying 3.4 Mbps by 0.3/1.7. A region allocation bandwidth for the traffic light in the front region gaze region FAF3 is calculated to be 1.0 Mbps by multiplying 3.4 Mbps by 0.5/1.7. Further, a region allocation bandwidth for the non-gaze region in the front region is calculated to be 1.0 Mbps by multiplying 3.4 Mbps by 0.5/1.7.

Similarly, in the rear region BA, a region allocation bandwidth for the following vehicle in the rear region gaze region BAF1 is calculated to be 0.6 Mbps by multiplying 1.0 Mbps by 0.3/0.5. A region allocation bandwidth for the non-gaze area in the rear region is calculated to be 0.4 Mbps by multiplying 1.0 Mbps by 0.2/0.5.

In the left region LA, there is no detected object. A region allocation bandwidth for the non-gaze region is calculated to be 0.6 Mbps by multiplying 0.6 Mbps by 0.3/0.3.

In the right region RA, a region allocation bandwidth for the bus of the right region gaze region BAF1 is calculated to be 0.4 Mbps by multiplying 1.0 Mbps by 0.2/0.5. A region allocation bandwidth for the non-gaze region of the right region is calculated to be 0.6 Mbps by multiplying 1.0 Mbps by 0.3/0.5. As described above, the region bandwidth allocation unit 104 allocates the region bandwidth to all the detected objects. The transmission unit 106 performs encoding into a moving image according to the allocated bandwidth and transmits the moving image (step S8).

The transmission system according to the present example embodiment described above can transmit a high-quality video suitable for remote operation while suppressing the occurrence of loss and delay. It is also possible to selectively detect objects that may be important to the remote operator from camera to camera and to transmit such objects in a relatively high quality video. In other words, it is possible to suppress the occurrence of loss or delay in the mobile communication network by reducing the allocated bandwidth for an object which cannot be important to the remote operator.

Fourth Example Embodiment

A transmission system according to a fourth example embodiment will be described with reference to FIGS. 16 and 17.

Figure 16:
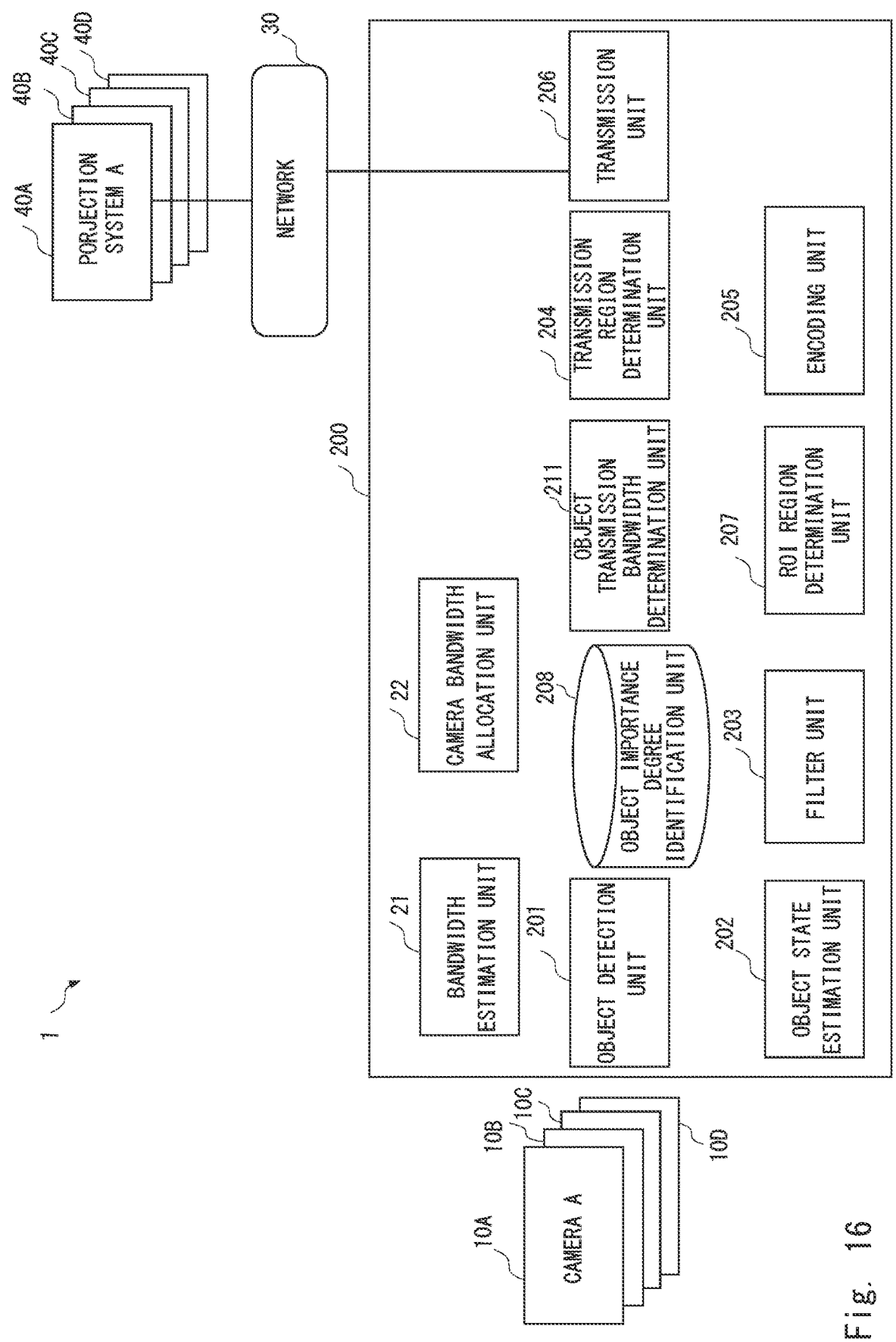
FIG. 16 is a block diagram illustrating a configuration of a transmission system according to a fourth example embodiment.
Figure 17:
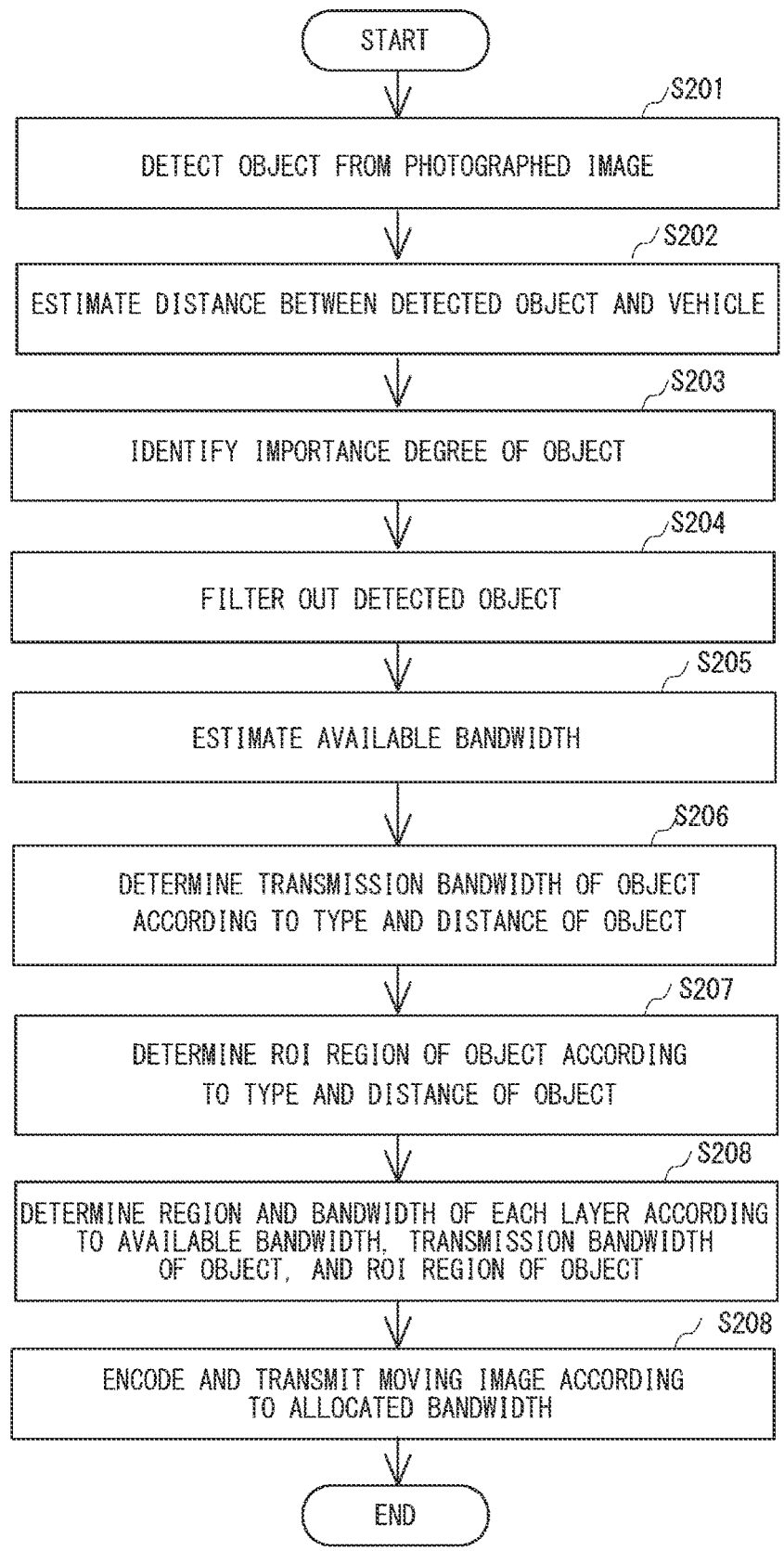
FIG. 17 is a flowchart illustrating an operation of the transmission system according to the fourth example embodiment.

FIG. 16 is a block diagram illustrating a configuration of the transmission system according to the fourth example embodiment. FIG. 17 is a flowchart illustrating an operation of the transmission system according to the fourth example embodiment.

A transmission system 1 encodes images photographed by a plurality of cameras 10A to 10D mounted on a vehicle into a moving image and transmits the moving image. The transmission system 1 includes an information processing device 200 that analyzes an image photographed by a vehicle-mounted camera 10, manages a communication bandwidth, based on the analysis result, and transmits video data via a network 30. The video data are projected onto a projection system 40 at a remote monitoring center and presented to a remote operator. In the present example embodiment, a single information processing device 200 physically performs overall processing on a plurality of cameras. An example of a hardware configuration of the information processing device 200 is illustrated in FIG. 26.

As illustrated in FIG. 16, the information processing device 200 includes a bandwidth estimation unit 21, a camera bandwidth allocation unit 22, an object detection unit 201, an object state estimation unit 202, an object importance degree identification unit 208, an object transmission bandwidth determination unit 211, a filter unit 203, a transmission region determination unit 204, an ROI (Region of Interest) region determination unit 207, an encoding unit 205, and a transmission unit 206.

An operation of the transmission system according to the present example embodiment will be described with reference to FIG. 17. Although the flowchart of FIG. 17 illustrates a specific order of execution, the order of execution may be different from the depicted form. For example, the order of execution of two or more steps may be interchanged with respect to the order illustrated. Also, two or more steps illustrated in succession in FIG. 17 may be performed simultaneously or partially simultaneously. Further, in some example embodiments, one or more of the steps illustrated in FIG. 17 may be skipped or omitted.

The object detection unit 201 detects a target object from images photographed by a plurality of cameras, and acquires a type of the object, a position of the object in the image, and a size of the object in the image (step S201). The object state estimation unit 202 estimates a distance from a vehicle to the object, based on the type of the detected object, the position of the object in the image, and the size of the object in the image (step S202). These object detection process and distance estimation process are similar to steps S1 and S2 of the second example embodiment described above, and a detailed description thereof will be omitted.

The object importance degree identification unit 208 identifies an importance degree of each camera, based on the type of the object and the distance from the vehicle (step S203). The object importance degree identification unit 208 refers to the distance threshold table (FIG. 10) described above, regards an object that is closer than a threshold as an important physical object, and assigns the importance degree described in the object importance degree table (FIG. 11) described above.

Figure 18:
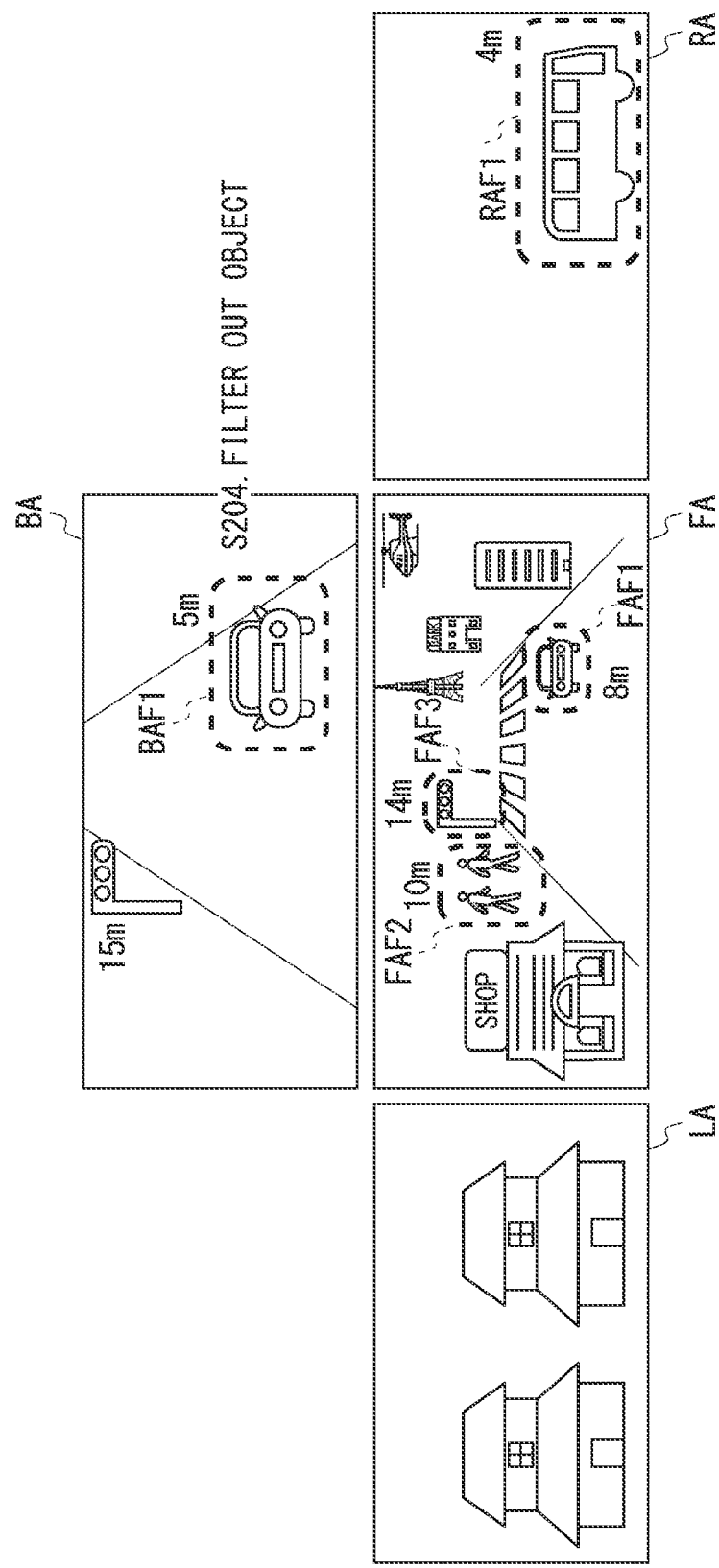
FIG. 18 is a diagram explaining an object filtering-out process by using an example of a video photographed by each camera.

As illustrated in FIG. 18, the filter unit 203 filters out an object that is not transmitted from the detected object according to a distance of each object (step S204). By doing so, it is possible to exclude those having a low degree of importance. Further, as described above, objects other than what a person having a visual acuity of 0.8 or more can recognize in a range of vision (e.g., in a case of a road sign on a general road, a driver can recognize the sign at a distance of 10.66 m) can be excluded. As a result, transmission data can be reduced.

The bandwidth estimation unit 21 estimates the available bandwidth (step S205). In the cellular phone network, since the available bandwidth constantly fluctuates, the bandwidth estimation unit 21 estimates the available bandwidth at a predetermined cycle (e.g., every second).

The object transmission bandwidth determination unit 211 determines the transmission bandwidth of the object according to the type of the object and the distance to the object (step S206). The object transmission bandwidth determination unit 211 acquires a bit rate conversion formula with reference to a bit rate conversion formula table illustrated in FIG. 19, substitutes the distance into the bit rate conversion formula, and determines a transmission bit rate of the object. In this manner, the bit rate can be adjusted according to recognition difficulty depending on the distance and the physical object type. In the bit rate conversion formula illustrated in FIG. 19, a and b are optional parameters, and x indicates a distance to an object.

Figure 20:
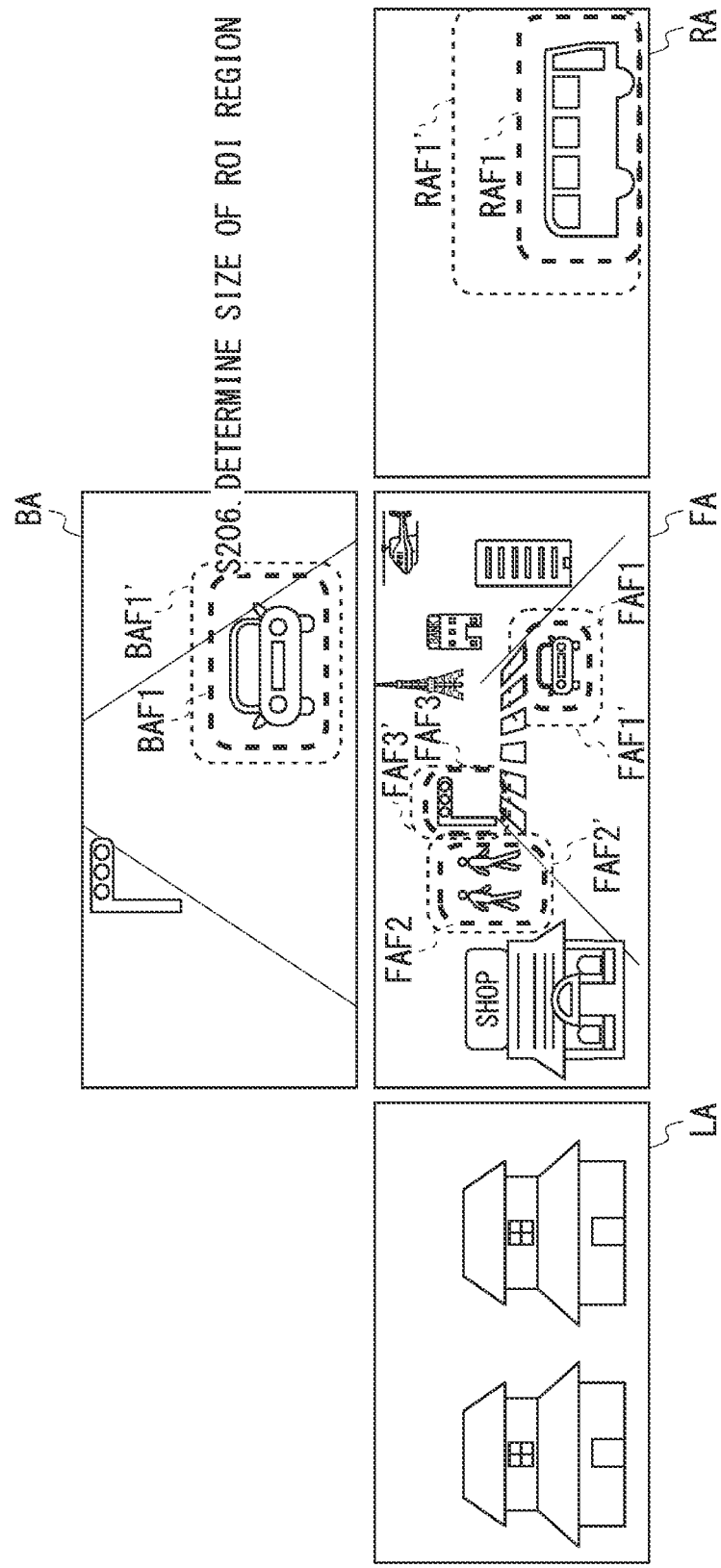
FIG. 20 is a diagram explaining a ROI region size determination process by using an example of a video photographed by each camera.

The ROI region determination unit 207 determines an ROI region for the object (step S207). FIG. 20 is a diagram explaining an ROI region size determination process by using an example of a video photographed by each camera. Based on an ROI region size ratio table (FIG. 21), each ROI region size (FAF1', FAF2', FAF3', BAF1', RAF1') is determined for the size of the object considered important in the filtering-out process described above. As illustrated in FIG. 21, the ROI region size of a moving object (e.g., a person or a car) is set to be larger than the ROI region size of a fixed object (e.g., a traffic light). As a result, the moving object has a low position prediction accuracy, the ROI region with respect to the object can be set large, and the probability that the physical object will fit in the gaze region can be increased.

The transmission region determination unit 204 determines a region and a bandwidth of each layer according to the available bandwidth, the transmission bandwidth of the object, and the ROI region of the object (step S208). Herein, with reference to FIGS. 22 to 25, a method of determining an ROI region to be actually transmitted by the transmission region determination unit 204 will be described.

Figure 22:
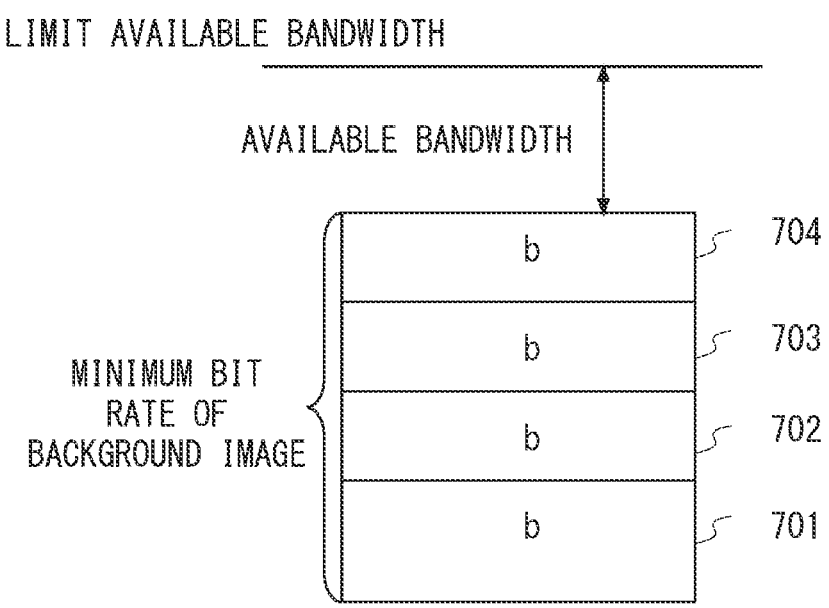
FIG. 22 is a diagram explaining a transmission region determination process.
Figure 23:
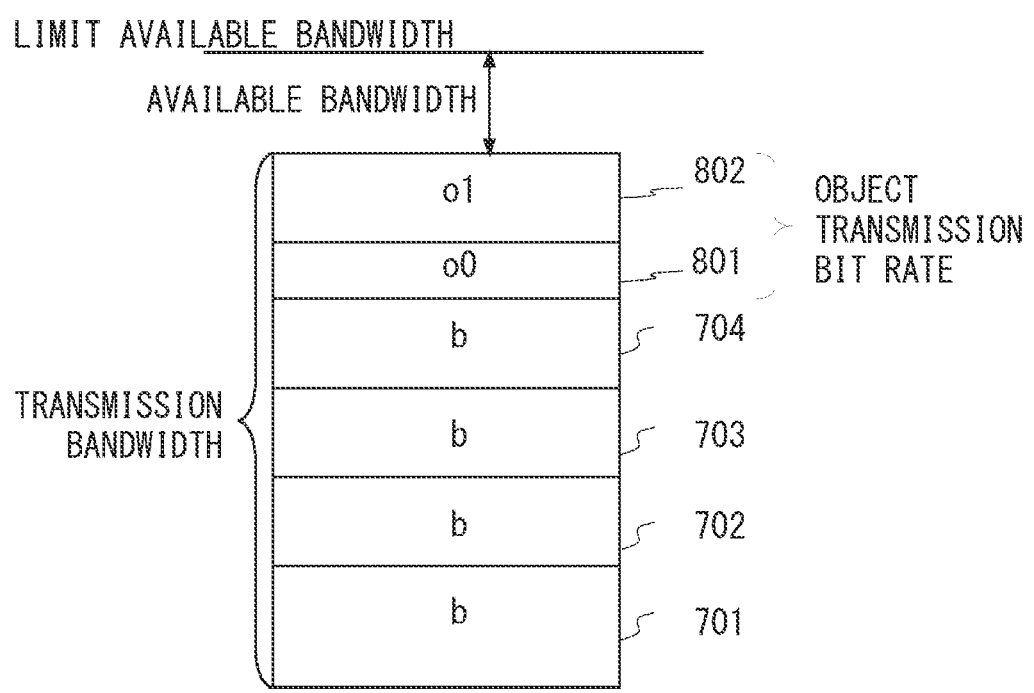
FIG. 23 is a diagram explaining the transmission region determination process.
Figure 24:
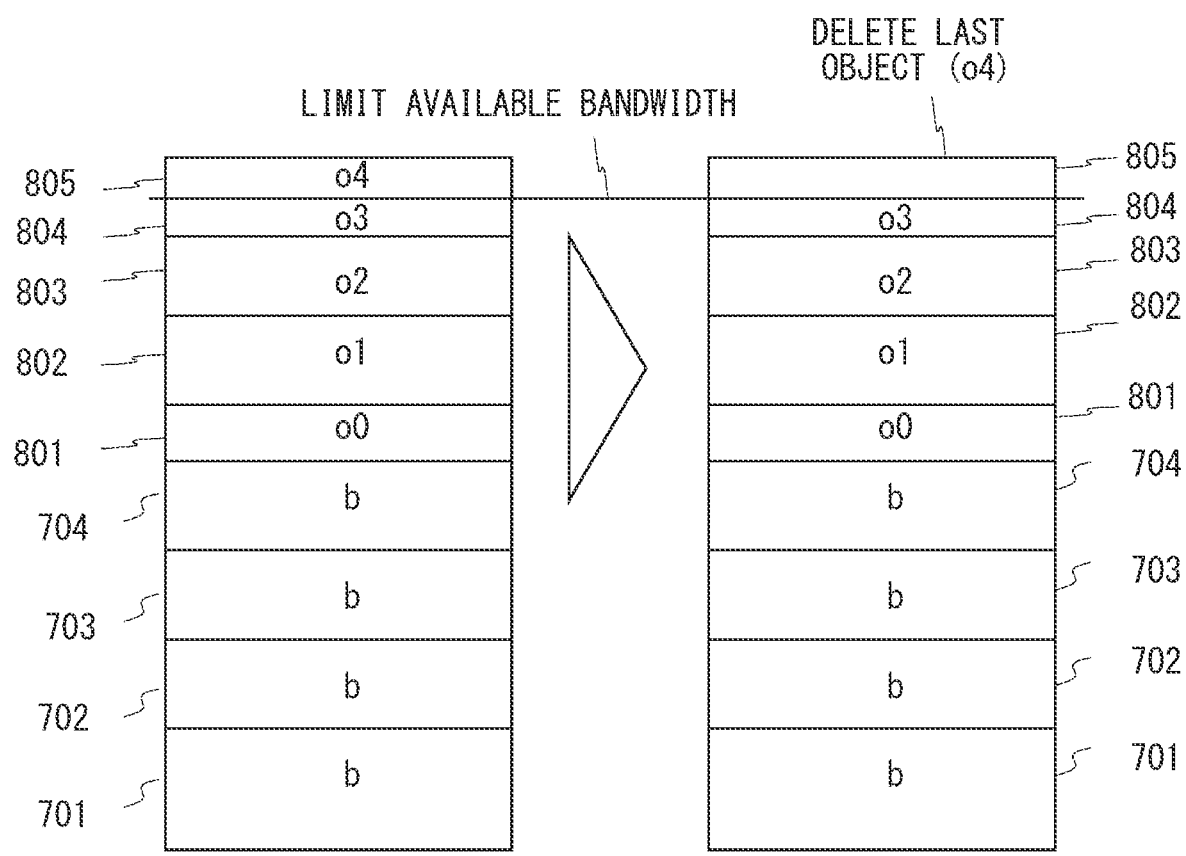
FIG. 24 is a diagram explaining the transmission region determination process.

As illustrated in FIG. 22, a bit rate of a background region of each camera is set to the lowest bit rate of the background region, and a total bit rate of the background regions is added to a usage bandwidth. Next, as illustrated in FIG. 23, among all the cameras, an object having a short distance is added to a transmission object list, and the transmission bit rate of the object is added to the usage bandwidth. This process is performed until there is no object to be transmitted or the available bandwidth is lower than 0. As illustrated in FIG. 24, when the transmission bandwidth exceeds the limit available bandwidth, an object (object o4) added last is deleted from a transmission object list.

Figure 25:
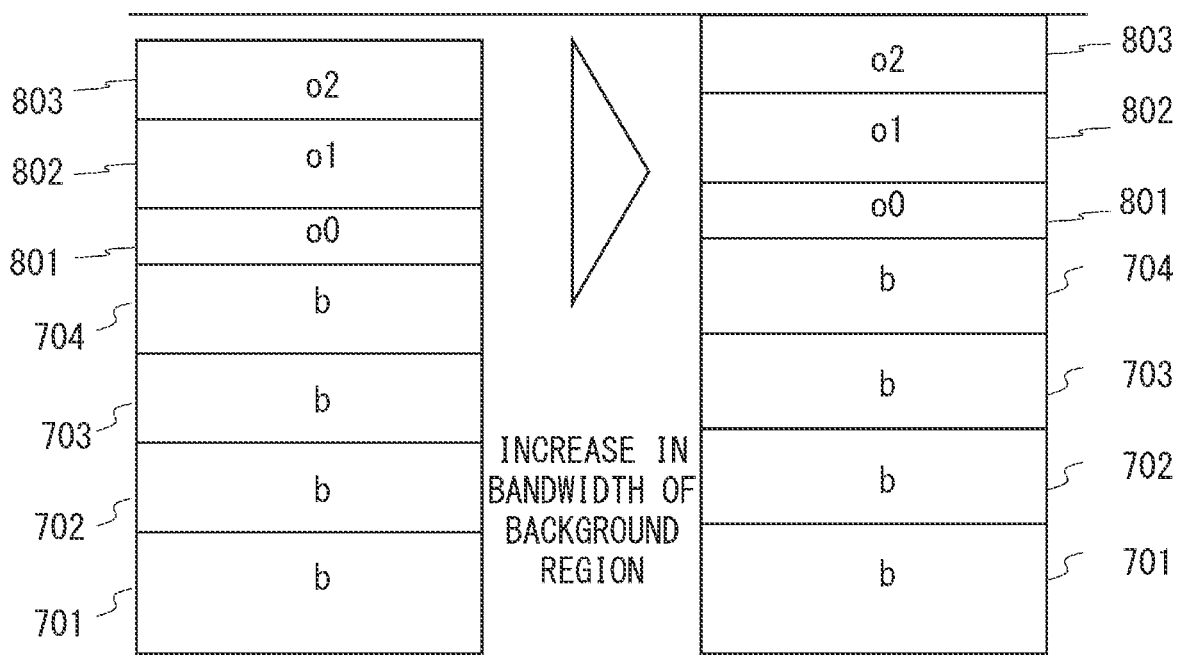
FIG. 25 is a diagram explaining the transmission region determination process.

Alternatively, as illustrated in FIG. 25, when there is no object to be transmitted despite remaining available bandwidth, the remaining available bandwidth is divided by a minimum bit rate ratio of the background region. As a result, it is possible to increase the bandwidth of the background region, and it is possible to transmit an image of the background region of the highest quality as possible to the remote operator while suppressing loss and delay.

The encoding unit 105 encodes the moving image according to the allocated bandwidth. The transmission unit 106 transmits the encoded moving image (step S208).

The transmission system 1 according to the present example embodiment described above can transmit high-quality video optimized for remote operation while suppressing loss and delay. Further, according to the present example embodiment, even when the object is a mobile object, the ROI region can be expanded accordingly, and a higher quality video can be transmitted. In addition, in the present example embodiment, the bit rate can be determined according to the difficulty of recognition depending on the distance and the physical object type by providing with a physical object transmission bandwidth determination unit.

Further, in the various example embodiments described above, in addition to the transmission system, the system control device may also be configured as a single unit. The system control device includes a bandwidth estimation unit that estimates an available bandwidth, which is a bandwidth available in the network, and a camera bandwidth allocation unit that allocates a bandwidth for each camera according to the available bandwidth and the importance degree of each camera in order to transmit an image photographed by a plurality of cameras mounted on the vehicle.

In the above examples, a program can be stored by using various types of non-transitory computer readable media and provided to a computer. Non-transitory computer readable media include various types of tangible storage media. Examples of the non-transitory computer readable media include magnetic recording media, magneto-optical recording media (e.g., magneto-optical disks), read only memory (CD-ROM), CD-R, CD-R/W, semiconductor memory. The magnetic recording medium may be, for example, a flexible disk, a magnetic tape, or a hard disk drive. The semiconductor memory may be, for example, a mask ROM, a programmable ROM (PROM), an erasable PROM (EPROM), a flash ROM, or a Random Access Memory (RAM). The program may also be supplied to the computer by various types of transitory computer readable media. Examples of transitory computer-readable media include electrical signals, optical signals, and electromagnetic waves. The transitory computer readable medium may provide the program to the computer via wired communication paths such as electrical wires and optical fibers or a wireless communication path.

Note that the present invention is not limited to the above-mentioned example embodiments, and can be appropriately modified within a range not deviating from the gist. The plurality of examples described above may be implemented in combination as appropriate.

Some or all of the above example embodiments may also be described as the following supplementary notes, but are not limited to the following.

Supplementary Note 1

A transmission method of transmitting an image photographed by a plurality of cameras mounted on a vehicle via a network, the transmission method including:
  a bandwidth estimation step of estimating an available bandwidth which is a bandwidth available in the network; and
  a camera bandwidth allocation step of allocating a bandwidth to each camera according to the available bandwidth and an importance degree of each camera.

Supplementary Note 2

The transmission method according to Supplementary note 1, further including: a step of identifying an importance degree of each of the cameras;
- an object detection step of detecting a target object from images photographed by the plurality of cameras, and acquiring a type of an object, a position of an object in an image, and a size of an object in an image;
- an object state estimation step of estimating a distance from a vehicle to an object from the type of the object detected, the position of the object in the image, and the size of the object in the image;
- an object importance degree identification step of identifying an importance degree of an object, based on the type of the object and the distance from the vehicle; and
- a camera importance degree identification step of identifying an importance degree of each of the cameras, based on a total value of importance degree of the objects detected for each of the cameras.

Supplementary Note 3

The transmission method according to Supplementary note 2, further including a region bandwidth allocation step of allocating a bandwidth for transmission of a moving image of a region in which the detected object is photographed, according to a bandwidth allocated to each of the cameras and an importance degree of the object.

Supplementary Note 4

The transmission method according to Supplementary note 2, wherein the object importance degree identification step identifies an importance degree of the object, based on a distance threshold table indicating a threshold value of a distance between a vehicle and each object, and an object importance degree table indicating an importance degree by associating a camera with each object.

Supplementary Note 5

The transmission method according to Supplementary note 4, further including a vehicle state detection step of detecting a vehicle state, wherein, in the object importance degree identification step, the distance threshold table and the object importance degree table are changed depending on the vehicle state.

Supplementary Note 6

The transmission method according to Supplementary note 4, wherein the object state estimation step estimates an orientation of an object, and
the object importance degree identification step changes the object importance degree table depending on the estimated orientation of the object.

Supplementary Note 7

The transmission method according to Supplementary note 2, wherein the object state estimation step estimates a distance by using a learning model different for each camera.

Supplementary Note 8

The transmission method according to any one of Supplementary notes 2 to 7, further including a ROI region determination step of determining an ROI region of the detected object according to the type of the object and the size of the object.

Supplementary Note 9

The transmission method according to Supplementary note 8, wherein, in the ROI region determination step, an ROI region size when a detected object is a mobile object is set to be larger than an ROI region size when the detected object is a fixed object.

Supplementary Note 10

The transmission method according to any one of Supplementary notes 2 to 9, further including a filtering processing step of filtering out an object not to be transmitted from a detected moving image according to a distance to an object.

Supplementary Note 11

A transmission system configured to transmit an image photographed by a plurality of cameras mounted on a vehicle, via a network, the transmission system including:
- a bandwidth estimation unit configured to estimate an available bandwidth which is a bandwidth available in the network; and
- a camera bandwidth allocation unit configured to allocate a bandwidth to each camera according to the available bandwidth and an importance degree of each camera.

Supplementary Note 12

The transmission system according to Supplementary note 11, further including, in order to identify an importance degree of each of the cameras:
- an object detection unit configured to detect a target object from images photographed by the plurality of cameras, and acquire a type of an object, a position of an object in an image, and a size of an object in an image;
- an object state estimation unit configured to estimate a distance from a vehicle to an object from the type of object of the object detected, the position of the object in the image, and the size of the object in the image;
- an object importance degree identification unit configured to identify an importance degree of each of the cameras, based on the object type and a distance from the vehicle; and
- a camera importance degree identification unit configured to identify an importance degree of each camera, based on a total value of the importance degrees of the detected objects detected for each of the cameras.

Supplementary Note 13

The transmission system according to Supplementary note 12, further including a region bandwidth allocation unit configured to allocate a bandwidth for transmission of a moving image in which the detected object is photographed, according to the camera bandwidth and an importance degree of the detected object.

Supplementary Note 14

The transmission system according to Supplementary note 12, wherein the object importance degree identification unit manages an importance degree, based on a distance threshold table indicating a threshold value of a distance between a vehicle and each object, and an object importance degree table indicating an importance degree by associating a camera with each object.

Supplementary Note 15

The transmission system according to Supplementary note 14, further including a vehicle state detection unit configured to detect a vehicle state,
wherein the object importance degree identification unit changes the distance threshold table and the object importance degree table depending on the vehicle state.

Supplementary Note 16

The transmission system according to Supplementary note 14, wherein the object state estimation unit estimates an orientation of an object, and the object importance degree identification unit changes the object importance degree table depending on an orientation of an object.

Supplementary Note 17

The transmission system according to Supplementary note 12, wherein the object state estimation unit estimates a distance by using a learning model different for each camera.

Supplementary Note 18

The transmission system according to any one of Supplementary notes 12 to 17, further including an ROI region determination unit configured to determine an ROI region of an object according to the type of the object and the size of the object.

Supplementary Note 19

The transmission system according to Supplementary note 18, wherein an ROI region size when the detected object is a mobile object is set to be larger than an ROI region size when the detected object is a fixed object.

Supplementary Note 20

The transmission system according to any one of Supplementary notes 12 to 19, further including a filter unit configured to filter out an object not to be transmitted from a detected moving image, according to a distance to an object.

Supplementary Note 21

A system control device including, in order to transmit images photographed by a plurality of cameras mounted on a vehicle, a bandwidth estimation unit configured to estimate an available bandwidth which is a bandwidth available in a network; and
a camera bandwidth allocation unit configured to allocate a bandwidth to each camera according to the available bandwidth and an importance degree of each camera.

Supplementary Note 22

The system control device according to Supplementary note 21, further including, in order to determine an importance degree of each of cameras:
an object detection unit configured to detect a target object from images photographed by the plurality of cameras and acquire a type of an object, a position of an object in an image, and a size of an object in an image;
an object state estimation unit configured to estimate a distance from a vehicle to an object from the type of object of the object detected, the position of the object in the image, and the size of the object in the image;
an object importance degree identification unit configured to identify an importance degree of each of the cameras, based on the type of the object and the distance from the vehicle, and
a camera importance degree identification unit configured to identify an importance degree of each camera, based on a total value of importance degrees of the objects detected for each of the cameras.

Supplementary Note 23

The system control device according to Supplementary note 22, further including a region bandwidth allocation unit configured to allocate a bandwidth for transmission of a moving image of a region in which the detected object is photographed, according to a bandwidth allocated to each of the cameras and an importance degree of the object.

Supplementary Note 24

The system control device according to Supplementary note 22, wherein the object importance degree identification unit identifies an importance degree, based on a distance threshold table indicating a threshold value of a distance between a vehicle and each object and an object importance degree table indicating an importance degree by associating a camera with each object.

Supplementary Note 25

The system control device according to Supplementary note 24, further including a vehicle state detection unit configured to detect a vehicle state,
wherein the object importance degree identification unit changes the distance threshold table and the object importance degree table depending on the vehicle state.

Supplementary Note 26

The system control device according to any one of Supplementary notes 21 to 25, further including a filter unit configured to filter out an object not to be transmitted from a detected moving image according to a distance to the object.

REFERENCE SIGNS LIST

1 Transmission system
3 Remote operator
5 Vehicle
10 Vehicle-mounted camera
11 Bandwidth estimation unit
12 Camera bandwidth allocation unit
13 Vehicle state detection unit
21 Bandwidth estimation unit
22 Camera bandwidth allocation unit
30 Network
40 Projection system
100 Information processing device 101 Object detection unit
102 Object state estimation unit
103 Camera importance degree identification unit
104 Region bandwidth allocation unit
105 Encoding unit
106 Transmission unit
108 Object importance degree identification unit
201 Object detection unit
202 Object state estimation unit
203 Filter unit
204 Transmission region determination unit
205 Encoding unit
206 Transmission unit
207 ROI region determination unit
208 Object importance degree identification unit
211 Object transmission bandwidth determination unit
400 Ground monitoring remote control device
FA Front region
BA Rear region
RA Right region
LA Left region

What is claimed is:

1. A transmission method, via a network, comprising:
estimating an available bandwidth, which is a bandwidth available in the network;
detecting an object of an image captured by a camera of a plurality of cameras on a vehicle;
acquiring a size of the object in the image, a type of the object and a position of the object in the image;
estimating a distance from the vehicle to the object based on the size of the object in the image, the type of the object and the position of the object in the image;
identifying an importance degree of the object, based on the type of the object and the distance from the vehicle to the object;
determining an importance degree of each camera of the plurality of cameras based on a total value of importance degrees of objects detected for each of the cameras of the plurality of cameras; and
allocating a bandwidth to each camera of the plurality of cameras according to the available bandwidth and a corresponding importance degree of each camera of the plurality of cameras.

2. The transmission method according to claim 1, further comprising allocating a bandwidth for transmission of a moving image of a region in which the detected object is photographed, according to a bandwidth allocated to each of the cameras and an importance degree of the object.

3. The transmission method according to claim 1, further comprising identifying an importance degree, based on a distance threshold table indicating a threshold value of a distance between a vehicle and each object, and an object importance degree table indicating an importance degree by associating a camera with each object.

4. The transmission method according to claim 3, further comprising detecting a vehicle state,
wherein the distance threshold table and the object importance degree table are changed depending on the vehicle state.

5. The transmission method according to claim 3, further comprising estimating an orientation of an object,
wherein the object importance degree table is changed depending on the estimated orientation of the object.

6. The transmission method according to claim 1, further comprising filtering out an object not to be transmitted from a detected moving image according to a distance to an object.

7. A transmission system, via a network, the transmission system comprising:
at least one memory storing instructions; and
at least one processor configured to execute the instructions to;
estimate an available bandwidth in the network;
detect an object of an image captured by a camera of a plurality of cameras on a vehicle;
acquire a size of the object in the image, a type of the object, and a position of the object in the image;
estimate a distance from the vehicle to the object based on the size of the object in the image, the type of the object and the position of the object in the image;
identify an importance degree of the object, based on the type of the object and the distance from the vehicle to the object;
determine an importance degree of each camera of the plurality of cameras based on a total value of importance degrees of objects detected for each of the cameras of the plurality of cameras; and
allocate a bandwidth to each camera of the plurality of cameras according to the available bandwidth and a corresponding importance degree of each camera of the plurality of cameras.

8. The transmission system according to claim 7, wherein the at least one processor is further configured to execute the instructions to allocate a bandwidth for transmission of a moving image of a region in which the detected object is photographed, according to a bandwidth allocated to each of the cameras and an importance degree of the object.

9. The transmission system according to claim 7, wherein the at least one processor is further configured to execute the instructions to identify an importance degree, based on a distance threshold table indicating a threshold value of a distance between a vehicle and each object, and an object importance degree table indicating an importance degree by associating a camera with each object.

10. The transmission system according to claim 9, wherein the at least one processor is further configured to execute the instructions to detect a vehicle state, and wherein the distance threshold table and the object importance degree table are changed depending on the vehicle state.

11. The transmission system according to claim 9, wherein the at least one processor is further configured to execute the instructions to estimate an orientation of an object, and wherein the object importance degree table is changed depending on an orientation of an object.

12. The transmission system according to claim 7, wherein the at least one processor is further configured to execute the instructions to filter out an object not to be transmitted from a detected moving image, according to a distance to an object.

13. A system control device comprising:
at least one memory storing instructions; and
at least one processor configured to execute the instructions to:
estimate an available bandwidth which is a bandwidth available in a network;
detect an object of an image captured by a camera of a plurality of cameras on a vehicle;
acquire a size of the object in the image, a type of the object, and a position of the object in the image;
estimate a distance from the vehicle to the object based on the size of the object in the image, the type of the object and the position of the object in the image;

identify an importance degree of the object, based on the type of the object and the distance from the vehicle to the object;

determine an importance degree of each camera of the plurality of cameras based on a total value of importance degrees of objects detected for each of the cameras of the plurality of cameras; and allocate a bandwidth to each camera of the plurality of cameras according to the available bandwidth and a corresponding importance degree of each camera of the plurality of cameras.

14. The system control device according to claim 13, wherein the at least one processor is further configured to execute the instructions to allocate a bandwidth for transmission of a moving image of a region in which the detected object is photographed, according to a bandwidth allocated to each of the cameras and an importance degree of the object.

15. The system control device according to claim 13, wherein the at least one processor is further configured to execute the instructions to identify an importance degree, based on a distance threshold table indicating a threshold value of a distance between a vehicle and each object, and an object importance degree table indicating an importance degree by associating a camera with each object.

16. The system control device according to claim 15, wherein the at least one processor is further configured to execute the instructions to detect a vehicle state,
wherein the distance threshold table and the object importance degree table are changed depending on the vehicle state.

17. The system control device according to claim 13, wherein the at least one processor is further configured to execute the instructions to filter out an object not to be transmitted from a detected moving image, according to a distance to an object.

* * * * *